US010204528B2

United States Patent
Truong et al.

(10) Patent No.: US 10,204,528 B2
(45) Date of Patent: Feb. 12, 2019

(54) AUGMENTING TRANSPORT SERVICES USING DRIVER PROFILING

(71) Applicant: Uber Technologies, Inc., San Francisco, CA (US)

(72) Inventors: Michael Truong, San Francisco, CA (US); Benjamin Kolin, San Francisco, CA (US); Rami Mawas, San Francisco, CA (US); David Purdy, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 197 days.

(21) Appl. No.: 14/819,288

(22) Filed: Aug. 5, 2015

(65) Prior Publication Data

US 2017/0039890 A1 Feb. 9, 2017

(51) Int. Cl.
| | |
|---|---|
| G09B 19/16 | (2006.01) |
| G07C 5/08 | (2006.01) |
| G07C 5/02 | (2006.01) |
| B60W 40/09 | (2012.01) |
| G09B 5/00 | (2006.01) |
| G07B 15/00 | (2011.01) |
| G06Q 10/06 | (2012.01) |
| B60W 50/00 | (2006.01) |

(52) U.S. Cl.
CPC .......... *G09B 19/167* (2013.01); *B60W 40/09* (2013.01); *G07C 5/02* (2013.01); *G07C 5/08* (2013.01); *B60W 2050/0029* (2013.01); *B60W 2550/402* (2013.01); *G06Q 10/06398* (2013.01); *G07B 15/00* (2013.01); *G09B 5/00* (2013.01); *G09B 19/16* (2013.01)

(58) Field of Classification Search
CPC ........ G09B 19/167; G09B 5/00; G09B 19/16; B60W 40/09; B60W 2050/0029; B60W 2550/402; G07C 5/02; G07C 5/08; G06Q 10/06398; G07B 15/00
USPC ........................................................ 434/65
See application file for complete search history.

(56) References Cited

U.S. PATENT DOCUMENTS

| 6,195,648 B1 | 2/2001 | Simon |
| 6,263,435 B1 | 7/2001 | Dondeti |

(Continued)

FOREIGN PATENT DOCUMENTS

| EP | 1156462 | 11/2005 |
| EP | 2767962 | 8/2014 |

(Continued)

OTHER PUBLICATIONS

International Search report in PCT/US2016/016858 dated May 19, 2016.

(Continued)

*Primary Examiner* — Robert P Bullington
(74) *Attorney, Agent, or Firm* — Mahamedi IP Law LLP

(57) ABSTRACT

Trip is analyzed from a population of drivers in order to determine one or more indicators of one or more driving styles. The trip data may include sensor information obtained from one or more sensor devices which are present in a vehicle of each driver of the population. A driving style is determined for the driver during a monitored trip by analyzing sensor information obtained from one or more sensor devices of the driver during the trip for at least one of the indicators of the one or more driving styles.

16 Claims, 8 Drawing Sheets

(56) References Cited

U.S. PATENT DOCUMENTS

| | | |
|---|---|---|
| 8,010,285 B1 | 8/2011 | Denise |
| 8,417,448 B1 | 4/2013 | Denise |
| 8,417,449 B1 | 4/2013 | Denise |
| 8,538,158 B1 | 9/2013 | Denise |
| 8,670,930 B1 | 3/2014 | Denise |
| 8,718,926 B1 | 5/2014 | Denise |
| 8,915,738 B2 | 12/2014 | Mannino |
| 8,924,240 B2 | 12/2014 | Depura et al. |
| 8,934,719 B1 | 1/2015 | Denise |
| 9,097,545 B1 | 8/2015 | Denise |
| 9,898,759 B2 | 2/2018 | Khoury |
| 2008/0252412 A1 | 10/2008 | Larrson |
| 2008/0255722 A1* | 10/2008 | McClellan ............ B60R 25/102 701/31.4 |
| 2009/0088924 A1 | 4/2009 | Coffee |
| 2009/0192851 A1 | 7/2009 | Bishop |
| 2009/0234552 A1 | 9/2009 | Takeda |
| 2010/0020170 A1 | 1/2010 | Higgins-Luthman |
| 2010/0136994 A1 | 6/2010 | Taylor |
| 2011/0000747 A1 | 1/2011 | Wu |
| 2011/0301806 A1 | 12/2011 | Messier |
| 2012/0174111 A1 | 7/2012 | Pala |
| 2012/0191343 A1 | 7/2012 | Haleem |
| 2012/0232741 A1 | 9/2012 | Sekiyama |
| 2012/0232943 A1 | 9/2012 | Myr |
| 2012/0283893 A1* | 11/2012 | Lee ........................ G07C 5/008 701/1 |
| 2013/0005414 A1 | 1/2013 | Bindra et al. |
| 2013/0066688 A1 | 3/2013 | Pinkus |
| 2013/0226622 A1 | 8/2013 | Adamson |
| 2013/0311081 A1 | 11/2013 | Yamakawa |
| 2014/0051465 A1 | 2/2014 | Ruys et al. |
| 2014/0067434 A1 | 3/2014 | Bourne et al. |
| 2014/0129951 A1 | 5/2014 | Amin et al. |
| 2014/0207342 A1 | 7/2014 | Chen et al. |
| 2014/0358376 A1 | 12/2014 | Phelan |
| 2015/0095235 A1 | 4/2015 | Dua |
| 2015/0100505 A1 | 4/2015 | Binion |
| 2015/0106900 A1 | 4/2015 | Pinski |
| 2015/0113622 A1 | 4/2015 | Dua |
| 2015/0223024 A1 | 8/2015 | Abuodeh |
| 2015/0266455 A1 | 9/2015 | Wilson |
| 2015/0302342 A1 | 10/2015 | Yeh |
| 2015/0307107 A1* | 10/2015 | Tamari ................ G07C 5/0808 701/32.4 |
| 2015/0348221 A1 | 12/2015 | Pedersen |
| 2017/0132540 A1 | 5/2017 | Haparnas |
| 2017/0371608 A1 | 12/2017 | Wasserman |
| 2017/0372534 A1 | 12/2017 | Steketee |
| 2018/0086347 A1 | 3/2018 | Shaikh |
| 2018/0089605 A1 | 3/2018 | Poornachandran |

FOREIGN PATENT DOCUMENTS

| | | |
|---|---|---|
| EP | 2700063 | 6/2015 |
| JP | 2014-130552 | 6/2014 |
| KR | 10-2014-0124137 | 10/2014 |
| WO | WO2012080741 A1 | 6/2012 |

OTHER PUBLICATIONS

International Search Report and Written Opinion in PCT/US2016/026799 dated Jul. 28, 2016.
International Search Report and Written Opinion in PCT/US2017/037421 dated Aug. 31, 2017.
IPRP in PCT/2016/016858 dated Aug. 17, 2017.
Written Opinion issued in SG 11201708199T dated May 7, 2018.
IPRP in PCT/US2016/026799 dated Oct. 17, 2017.

* cited by examiner

AUGMENTING TRANSPORT SERVICES USING DRIVER PROFILING

BACKGROUND

Transport services are increasingly becoming more diverse and common, particularly with the advance of on-demand services. Many such services enable individual users to participate in the role of driver. For example, transport services currently exist which enable users acting as drivers to provide transport for other users, as well as to deliver packages, goods and/or prepared foods. Still further, some transport services enable users to operate as drivers in connection with performing tasks or providing different types of location-dependent services.

DETAILED DESCRIPTION

Figure 1A:
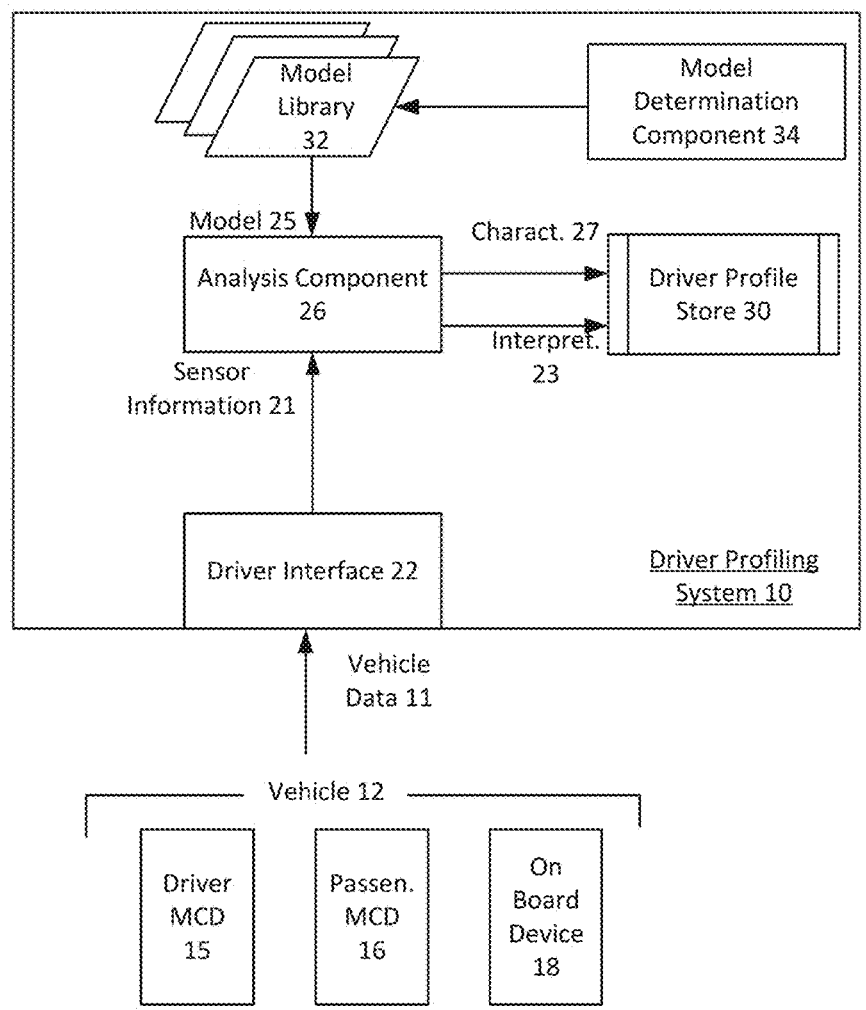
FIG. 1A illustrates a driver profiling system for obtaining and utilizing profile information relating to driver quality and behavior in connection with a transport service, according to some embodiments.

Examples described herein enhance or otherwise augment vehicle driven transport services by way of profiling the drivers (or service providers) who operate the vehicles when services are being provided. In particular, alternative examples are provided to detect, model, and/or predict outcomes or situations, including undesirable situations such as driver impersonation or aggressive driving.

According to some examples, trip data is analyzed from a population of drivers in order to determine one or more indicators of one or more driving styles. The trip data may include sensor information obtained from one or more sensor devices which are present in a vehicle of each driver of the population. A driving style is determined for the driver during a monitored trip by analyzing sensor information obtained from one or more sensor devices of the driver during the trip for at least one of the indicators of the one or more driving styles.

In some variations, a set of ground truth data is obtained which reflects a first set of indicators indicating an aggressive driving style. A model can be determined for the aggressive driving style, and based on the model, one or more characterizations can be determined for the driving style of individual drivers. The one or more characterizations can be confirmed based on information determined about individual drivers, or based on information about a respective trip of the respective drivers. A determination can be made of a driving style for the driver during a monitored trip by analyzing sensor information obtained from one or more sensor devices of the driver during the trip for at least one of the indicators of the one or more driving styles.

Embodiments described herein also include a driver verification system and service to authenticate drivers of a transport service so as to prevent driver-substitution fraud. In some embodiments, driver verification includes authenticating individual drivers as being the true and authorized individual, or alternatively, identifying drivers as unauthorized substitutes for authorized individuals. Examples recognize that with increasing number of drivers and transport services, a risk exists for a network service provider (e.g., an entity that operates a service arrangement system) when authorized drivers can lend their service identity to unauthorized individuals to enable the unauthorized individuals to impersonate the driver and otherwise have a role which they would not otherwise be able to have (e.g., unauthorized driver may have a poor driving record). Such unauthorized driver substitutions can raise issues of liability and safety, particularly since non-authorized individuals may not have undergone screening (e.g., background or driving checks) or been approved for the role.

While it is desirable to verify that a given driver can be authenticated, service arrangement systems (e.g., transport systems) enable a vast number of vehicles and drivers to use such systems. The cost and resources needed to equip such vehicles with specialized hardware or communication interfaces for driver verification purposes can be prohibitively expensive. Thus, for example, while it may be possible for vehicles to carry retina or fingerprint scanners to verify drivers before they provide transport services, the cost of adding such equipment can be burdensome given the total number of vehicles and drivers that are currently using the network service to provide transport services. Moreover, such equipment can be easily circumvented. For example, if fingerprint or retina scanners are used to enable vehicle ignition, the authorized driver can simply start the vehicle for the unauthorized driver. Accordingly, examples described herein provide for driver verification to be performed using equipment that drivers typically carry with them-specifically, mobile computing devices such as cell phones, feature phones (e.g., APPLE IPHONE), tablets or wearable electronic devices. Among other benefits, examples as described herein utilize the described equipment for performing verification of drivers, and thus reduces the need for individual vehicles or drivers to carry any additional specialized hardware. Moreover, examples as described enable driver verification to be performed using computing operations that are executed as background processes of a mobile computing device of a driver, without disturbing the driver's natural tendency and behavior. Moreover, examples as described enable data collection and verification to be selectively focused on instances and situations where verification checks are most needed. This reduces the volume of data that is processed and analyzed, leading to a more efficient result where individuals whom are verified have a much greater probability of being unauthorized substitutions.

Examples described herein include a driver verification system comprising a memory and a processor. The processor can execute instruction which are stored in memory in order to obtain one or more authentication datums for the driver. During a first set of transport service days of operation (e.g., when the driver first "logs in" for to start providing service), a driver profile is determined using data provided from a mobile computing device that is associated with the driver and carried in the vehicle when the transport services are provided. The driver profile can be associated with the one or more authentication datums, and can identify one or more characteristics of the driver when the driver is on one of the transport service trips. During a second transport service trip, data obtained from the mobile computing device of the driver is used to monitor the driver for information that is probative of the one or more characteristics. A preliminary verification determination can be made for the driver based at least in part on a comparison of the driver information and the driver profile. A verification communication can be generated for the driver based at least in part on the verification determination. The verification communication may specify one or more verification actions that the driver is to perform in order for the driver to be authenticated for his or her identity.

Still further, in some embodiments, a driver verification system and method is provided in which a driver profile is determined for a driver, and the driver profile is used as a basis of comparison with monitored actions of the driver during a trip. A preliminary verification determination can be made for the driver based at least in part on the comparison. From the comparison, a verification action can be required from the driver, and the verification action can be evaluated to determine whether the driver is the true and authorized individual for the role.

According to some examples, a driver verification system can operate to evaluate a verification response from the driver. The response can result in a verification determination which can conclude whether the driver is an unauthorized substitute or the authorized individual.

According to some examples, a system can be implemented in connection with the transport service for purpose of verifying that drivers in the field can be authenticated as to their respective identities. With the growth of on demand transport services, there are more drivers and more opportunities for individuals to impersonate authorized drivers, particularly when malfeasance on the part of authorized drivers facilitates unauthorized driver substitutions. While an authenticated driver of an on-demand system may have been checked for background and driving record, an unauthorized substitution can simply avoid being checked. In order to detect instances when a driver is actually an impersonator of another driver, verification checks (sometimes referred to as verification determinations) can be implemented on a driver verification system such as shown with an example of FIG. 1B. As described with numerous examples, the verification checks may require the driver to perform verification actions which can either authenticate the driver to his or her identity, or expose the driver as an unauthorized driver substitution.

Among other benefits and technical effect, examples described herein promote secure operation of a network service which arranges transport or delivery services to be provided by drivers for requesting users, or alternatively, which provides transport services. The security of a transport system can be jeopardized when unknown individuals substitute for one another when tasks are performed. Additionally, dedicated or specialized devices (e.g., fingerprint scanner, retina scanner, etc.) for detecting impersonators can be expensive for the service provider and intrusive for the drivers of the service. Rather than utilizing specialized or new equipment, examples such as provided below utilize processes on existing devices operated by drivers (e.g., mobile computer devices) in order to determine when additional verification actions should be performed. Among other benefits, a computer system or service which provides the network services can operate more efficiently and securely by implementing examples such as provided below. The added level of security against unauthorized use can be achieved without use of additional hardware resources, and without significant disruption to the time requirements of the drivers who are being verified. Additionally, dedicated and specialized devices and hardware resources are more likely to both breakdown and malfunction. Malfunctioning devices can sometimes provide additional risk, in that the malfunction may be difficult to detect and generate results which are false matches.

Moreover, in some implementations, a transport arrangement system can be implemented to include a driver verification system, such as described with examples provided below. In such implementations, the transport arrangement system can operate to verify individual drivers during their respective trips, and while those drivers operate in the field. In this way, the transport arrangement system can minimize the overall resource investment required to perform verification checks of their drivers.

As used herein, a client device, a driver device, and/or a computing device refer to devices corresponding to desktop computers, cellular devices or smartphones, personal digital assistants (PDAs), laptop computers, tablet devices, television (IP Television), etc., that can provide network connectivity and processing resources for communicating with the system over a network. A driver device can also correspond to custom hardware, in-vehicle devices, or on-board computers, etc. The client device and/or the driver device can also operate a designated application configured to communicate with the service arrangement system.

While some examples described herein relate to transport services, the service arrangement system can enable other on-demand location-based services (for example, a food truck service, a delivery service, an entertainment service) to be arranged between individuals and service providers. For example, a user can request an on-demand service, such as a delivery service (e.g., food delivery, messenger service, food truck service, or product shipping) or an entertainment service (e.g., mariachi band, string quartet) using the system, and the system can select a service provider, such as a driver, food provider, band, etc., to provide the on-demand service for the user.

One or more embodiments described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more embodiments described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some embodiments described herein can generally require the use of computing devices, including processing and memory resources. For example, one or more embodiments described herein may be implemented, in whole or in part, on computing devices such as servers, desktop computers, cellular or smartphones, personal digital assistants (e.g., PDAs), laptop computers, printers, digital picture frames, network equipment (e.g., routers) and tablet devices. Memory, processing, and network resources may all be used in connection with the establishment, use, or performance of any embodiment described herein (including with the performance of any method or with the implementation of any system).

Furthermore, one or more embodiments described herein may be implemented through the use of instructions that are executable by one or more processors. These instructions may be carried on a computer-readable medium. Machines shown or described with figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, embodiments may be implemented in the form of computer-programs, or a computer usable carrier medium capable of carrying such a program.

System Description

FIG. 1A illustrates a driver profiling system for obtaining and utilizing profile information relating to driver quality and behavior in connection with a transport service, according to some embodiments. In FIG. 1A, a driver profiling system 10 can be implemented for a variety of objectives, using alternative or different forms of input signals to model or otherwise characterize different aspects of a driver's quality or behavior. As illustrated with FIG. 1B, the driver profiling system 10 can be implemented as a subsystem or component of a transport arrangement service or provider. Among other examples, the type of objective which can be provided from driver profiling can include (i) indication of driver identity for purpose of driver verification (e.g., detecting fraud when driver is imposter), and/or (ii) driving style of driver, such as for undesirable driving style or characteristics.

In more detail, driver profiling system 10 can include a vehicle interface 22 and an analysis component 26. The vehicle interface can operate to monitor and obtain sensor information 21 from sensor-based devices which are present in a vehicle used by the driver during a trip. The analysis component 26 can process sensor information 21 in order to determine one or more characterizations 27, which can relate to one or more of (i) the driver, (ii) the driver's quality or behavior during the trip, and/or (iii) the driver's quality or behavior during a portion of the trip. In some variations, the analysis component 26 can base the characterizations 27 which are determined for a given driver on interpretations 23 of the sensor information 21. As an addition or alternative, the analysis component can utilize a model 25 (or set of models) to determine the one or more characterizations 27 of the driver, based on the sensor information 21 and/or interpretations 23. The characterization(s) 27 which are determined can be in the form of, for example, a quantitative expression, a score, ranking, or other form (e.g., flag for binary determination). The characterizations 27, as well as the interpretations 23, can be stored with a driver profile store 30, for use with a corresponding driver profile objective.

The operation of driver profiling system 10 can be configured or otherwise set to meet an objective which defines one or more aspect(s) of the driver or driver quality is profiled. As described in more detail, the analysis component 26 may interpret and/or compare sensor information 21 in a manner that meets the objective of the driver profiling system 10. As an addition or variation, the analysis component 26 can compare the sensor information 21 and/or interpretations 23 to one or more models 25, which are developed or selected for the objectives. The model(s) 25 can correspond to a structured form of observed data which provides a point of comparison to sensor information 21, and/or the interpretation 23 of the sensor information 21, as processed by the analysis component 26. Additionally, the type of sensor information 21 which is collected by the vehicle interface 22 (as well as the sources for the sensor information 21), and the type of model 25 which is used to characterize the driver can be based on the objective of the driver profiling system 10.

In some examples, a model library 32 and/or model determination component 34 can be used to determine one or more models 25 for determining characterizations 27. An example of a model determination component (or system) is illustrated with FIG. 5, which illustrates development and use of models for determining driving styles which are aggressive or potentially dangerous.

According to some examples, the vehicle interface 22 associates a vehicle 12 and/or a driver mobile computing device 15 with a given driver in order to determine vehicle data 11 and/or driver data 13 for the given driver. The vehicle data 11 can be based on sensors of the driver's mobile computing device 15, which can provide measurements for the driver's vehicle based on measurements taken by (i) one or more accelerometers (2-dimensional and/or 3 dimensional), (ii) a gyroscope, (iii) a GPS component, and/or (iv) other sensors such as magnetometer or altimeter. As such, the vehicle data 11 can include, for example, location information (e.g., such as provided by Global Positioning System (GPS) data), accelerometer data (including three-dimensional acceleration measurements), and/or gyroscopic measurements. In some variations, the vehicle interface 22 can communicate with other sensor devices which are known to be present in the driver's vehicle 12. For example, the vehicle interface 22 can communicate with the mobile computing device 16 of a passenger in order to obtain vehicle data 11, or otherwise validate the vehicle data which is obtained from the driver's device 16. Still further, as another addition or variation, the vehicle interface 22 can obtain vehicle data 11 from an onboard device 18, such as an Onboard Diagnostic device. The vehicle interface 22 can associate the driver and the vehicle data source, in determining and communicating sensor information 21 to the analysis component 26.

In some variations, the analysis component 26 determines interpretations 23 of the sensor information 21, from which comparisons to models 25 and/or characterizations 27 can be made. A process of interpreting sensor information 21 as interpretations 23 can include different levels of complexity, depending on the implementation and the objective of the driver profiling system 10. In some examples, the analysis component 26 can generate quantitative interpretations of the sensor information 21 which objectively describe the motion of the driver's vehicle. For example, the analysis component 26 can associate a velocity and/or acceleration behavior with the driver for a given segment of a trip. In some variations, the analysis component 26 can determine criteria based interpretations from the sensor information 21. The criteria based determinations can associate predetermined characterizations with specific interpreted values of the sensor information 21. For example, the interpretations 23 can score the driver on speed or braking level. Alternatively, the interpretations 23 can indicate or correlate to conclusions such as "drove too fast" when the driver's speed on a trip exceeds a predetermined criteria, or "made hard brake" or "made hard turn" when accelerometer data from the vehicle indicates a corresponding acceleration of a particular value that exceeds some threshold.

The analysis component 26 can also compare sensor information 21 and/or interpretations 23 to one or more models 25, in accordance with the objective of the driver profiling system 10. In some implementations, a given model 25 defines a behavior or event marker, such as a pattern or sequence of actions which are indicators of a particular characterization 27. For example, the model 25 can define a marker of aggressive driving in a manner that is correlative to (i) sensor information 21 of a particular type and/or value which meets a predefined criteria (e.g., threshold value), (ii) interpretations 23 of sensor information which meet a predetermined criteria, and/or (iii) a combination of sensor information 21 or interpretations 23. By way of example, when the sensor information indicates a pair of opposite accelerations with relatively large magnitudes (e.g., indicative of speeding then braking), the characterization 27 can correspond to "aggressive driving," or alternatively, some score reflecting the aggressiveness of the driver (e.g., an aggressive score with levels of "moderate" or "very aggressive"). Still further, the characterizations 27 can be tied to specific conditions, such as type of roadway or traffic conditions. In this way, the analysis component 26 can interpret sensor information 21, obtained from the vehicle of the driver for a given trip, in order to determine whether interpreted sensor information contains any matches to the pattern or sequence of actions that are deemed to be markers.

In some variations, the model(s) 25 can correspond to a multidimensional and learned data structure which is determined from observation (e.g., an observed population of drivers). In such implementations, the model 25 can be developed using a set of ground truth data, which can be obtained from datasets that are relative to the objective for the driver profiling system 10. For example, as described with an example of FIG. 5, one set of ground truth data for modeling aggressive drivers can be found with sensor information 21 obtained from drivers on trips were the driver was involved in an accident. The analysis component 26 can implement the model 25 in order to determine one or more characterizations 27. In some variations, the model 25 can be tuned with confirmation of the accuracy of the characterization 27 (if available).

In some implementations, the characterizations 27 of the analysis component 26 are made in real time, or responsively for the given trip while the trip is in progress or when the trip just completed. For example, the analysis component 26 can generate a characterization 27 of the driver for a current or just completed trip as being, for example, "cautious" or "aggressive". Similarly, the characterization 27 that the driver is an imposter can be made for a current or just completed trip. In variations, the characterizations 27 which are determined for a given driver and trip are aggregated, and processed in aggregate to develop a larger understanding of the driver's behavior (e.g., tendencies). For example, the characterization 27 can correlate the driver as being an aggressive type of driver based on the aggregate of the driver's quality in driving over multiple trips. The noted characterizations 27 (e.g., tendencies) of the driver can serve as both a classification of the driver style and an identifier of the driver.

In some variations, the analysis component 26 can also obtain mobile device usage data from the mobile device of the driver while a trip is in progress. The mobile device usage data can be correlated to position information, velocity or other characteristics of the vehicle motion. The mobile device usage data can include, for example, application monitors (e.g., indicating driver is texting or using the mobile device) or sensor monitors (e.g., indicating the mobile computing device is being held in the driver's hand). Such data can indicate that the mobile computing device is in use while the vehicle is on a trip. The mobile device usage data can also indicate, with respect to the driver's use of the mobile computing device, the type and quantity of use, and further correlate the usage data to trip or vehicle conditions (e.g., such as how fast vehicle is moving). In this way, the mobile usage data can be used to further characterize the driver as to unwanted driving characteristics, such as "distracted driving."

Figure 1B:
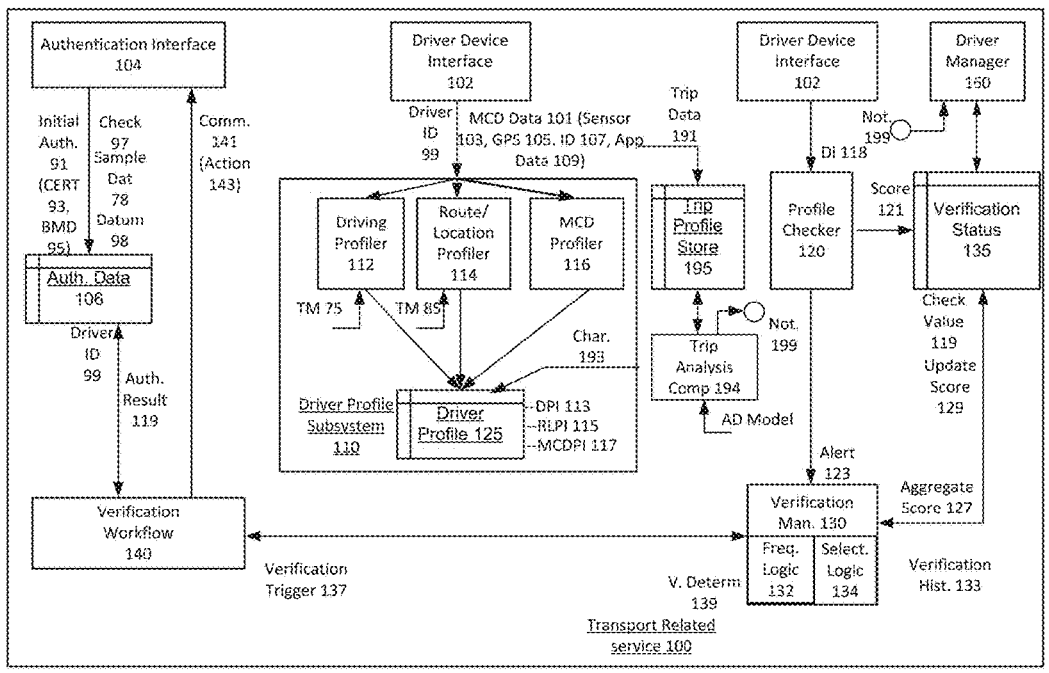
FIG. 1B illustrates a transportation related service which utilizes alternative forms of driver profile information to augment or enhance the transport services provided.

FIG. 1B illustrates a transportation related service which utilizes alternative forms of driver profile information to augment or enhance the transport services provided, according to one or more embodiments. According to some examples, a transport related service 100 can develop and implement one or more types of driver profile information for use with transportation service, with each type of driver profile utilizing different inputs and context. In one implementation or mode of operation, the transport related service 100 uses driver profiling as a mechanism to verify (or facilitate verification) that the driver is authorized and genuine, and not an imposter. In a variation, the transport related service 100 analyzes and evaluates the quality of the driving for specific characterizations of driving style, such as a characterization of aggressive driving, or other undesirable driver characteristics.

In an example of FIG. 1B, a transportation related service 100 is implemented with or as part of a transport arrangement service that provides or arranges transport services, such as people transportation, package delivery or on-demand delivery of mobile services. In an example of FIG. 1B, the transportation related service 100 can be implemented as a network service which communicates with mobile computing devices ("MCD") that are carried by drivers when drivers are available for providing transport services. The drivers of the transport arrangement system (e.g., those that use the system to provide transport services for requesting users) can correspond to users whom have the non-exclusive role of serving as a driver of a vehicle (e.g., their own vehicle).

In an example of FIG. 1B, the transportation related service 100 includes a driver device interface 102, a driver authentication interface 104, a driver profiling subsystem 110, a profile checker 120, a verification manager 130 and one or more verification workflow processes 140. In some implementations, the transportation related service 100 can be implemented as a network service component which communicates with the mobile computing devices of drivers for one or more transport services. The transportation related service 100 obtains data from the mobile computing device data ("MCD data 101") of a given driver when that driver is providing transport or available to provide transport (e.g., driver in vehicle or ready to accept a transport request). As described with various examples, the transportation related service 100 obtains the MCD data 101 for purpose of performing verification checks to authenticate drivers for their identity. Among other benefits, the transportation related service 100 enables repeated and managed verification checks on a large number of drivers, using sensor and/or other data obtained from the mobile computing device that are routinely carried by each driver. This enables data for driver verification to be obtained from the mobile computing device that is carried by each driver, rather than by specialized devices which add expense and inefficiency (e.g., Onboard Diagnostic interface devices, biometric sensors such as fingerprint or retina scanner, etc.). By way of example, the mobile computing device carried by individual drivers can correspond to a cellular telephone/message device (e.g., feature phone, smart phone), tablet or wearable computing device (e.g., computerized watch or eye glasses).

The driver profiling subsystem 110 can be implemented for one or multiple objectives, including driver verification and/or driver evaluation/analysis. The driver profiling subsystem 110 can be implemented in accordance with an example of driver profiling system 10, as described with FIG. 1A. According to some examples, the driver profiling subsystem 110 operates to develop a driver profile, which can be represented by a multidimensional set of data, shown as a driver profile store 125 in FIG. 1B. While a single driver profile store 125 is illustrated in FIG. 1B, in examples described herein, a memory resource or database can store a plurality of driver profile stores 125 corresponding to a plurality of drivers. In some variations, the driver profiling subsystem 110 can be implemented during or as part of a training phase, where information is obtained about various aspects of an individual driver's session. Information obtained in the training phase can characterize a quality level, effort or routine of the driver when the driver is providing transport, or alternatively when the driver makes himself available to a transport service (e.g., "on-duty"). Accordingly, the driver profile store 125 includes a set of parameters, of which individual parameters have values that are based on information which is obtained from a driver's work session. Furthermore, in some embodiments, the information that is determined from the driver's work session can be based primarily or exclusively on data communicated by a mobile computing device of the driver. In this way, the transportation related service 100 can perform verification checks on numerous drivers without expense of hardware or loss of convenience and time to the workforce.

In an example of FIG. 1B, the transportation related service 100 can be utilized with a transport arrangement service that manages and/or coordinates numerous drivers. The profile checker 120 operates to determine driver information 118 about a driver providing a transport service, in order to compare the driver information 118 that is determined for an individual driver with characteristics that define aspects of the driver profile store 125. As described below, the driver information 118 can include MCD data 101 (or variants 101B, 101C). The characteristics used with the profile store 125 can be represented by parametric values. In different aspects, the comparison performed by the profile checker 120 can result in a determination of (i) whether verification of the driver is to be performed, (ii) a selection of a verification action that is to be performed by the driver, and/or (iii) a frequency or designation of time when one or more verification actions or checks is to be performed. In some variations, an output of the profile checker 120 can correspond to a confidence score 121. The confidence score 121 can represent a multisession assessment as to a likelihood that the driver is someone other than the person who is authenticated for that role. The profile checker 120 can generate the confidence score 121 to represent a confidence level for the transportation related service 100, based on a likelihood that the particular driver is genuine and not an imposter.

The verification manager 130 can process various types of information regarding the determination or confidence level of the a driver's verification status in order to trigger one or more verification actions to be performed by the user. As described with numerous examples, the verification actions can be selected by, for example, kind, severity, duration, frequency, or randomness, based at least in part on the confidence level determined by the profile checker 120 in the authenticity of the driver.

The verification workflow 140 operates to generate a verification communication 141 for the driver. The verification communication 141 can be communicated to the mobile computing device of the driver as, for example, an application notification or message (e.g., on a service application of the driver), by email, or text message. The verification communication 141 can specify a verification action 143, and the driver can respond to the communication by electing to perform the specified verification action 143. According to some examples, the driver can respond to the verification communication 141 by performing the specified verification action 143. The verification action 143 can be performed using, for example, resources of the driver's mobile computing device, or other computing platform. The authentication interface 104 can be implemented in part using a programmatic interface of the driver's mobile computing device. Accordingly, the authentication interface 104 can receive or capture data corresponding to the authentication action 143 of the driver. In some variations, the verification communication 141 can specify one or more verification actions 143 for the driver (whom can be identified using driver identifier 99) with parameters that confine or limit the response from the driver. For example, the communication 141 may specify that the driver has to perform the verification action 143 in a designated location (e.g., in a parking lot, at a particular address, etc.) and within a set parameter of time (e.g., within ten minutes, immediately, etc.).

In some examples, the verification action 143 can specify an action that enables the authentication interface 104 to obtain an authentication datum 98 from the driver device. The authentication interface 104 can implement the authentication check 97 by referencing the authentication datum 98 against the similar or like authentication datums that are stored with the authentication data store 106. The verification workflow 140 can then obtain the authentication result 119 for the particular driver. The authentication result 119 can be communicated as a verification determination 139, and the authentication result 119 can be used to either manage the driver (e.g., instruct the driver to stop driving), or update a score or other parameter of verification status store 135.

In more detail, during a set up phase, a driver may provide initial authentication information 91 to the authentication interface 104 in order to authenticate his or her identity. The initial authentication information 91 can correspond to, for example, a certified information 93 (e.g., driver's license, passport), which can be combined with an image or other relevant biometric data 95. To ensure the biometric data 95 is an authentication source, the biometric data 95 can be submitted by the driver concurrently or simultaneously with the certified information 93, via the authentication interface 104. As an addition or an alternative, the initial authentication information 91 can be provided by the driver as part of an on-boarding process. The various components of the user's authentication process (e.g., driver's license and biometric data captured when driver's license is submitted to authentication interface 104) can be stored in the authentication data store 106 for subsequent use. In some variations, the transportation related service 100 can extend or generate additional authentication sources for drivers, by collecting the biometric data 95 during the time period when the driver is holding a driver's license or passport or other identification mechanism. This allows for additional samples of biometric data 95 to serve as an authentication source. For example, when the driver is in possession of a driver's license, the driver's image can be captured (e.g., holding the driver's license), and further the driver can be required to perform certain actions to record different types of biometric data 95. As examples, the driver can be required to record fingerprint information, retina data, face image and/or voice data. In variations, some or all of the initial authentication information 91 can be obtained from the drivers when the driver first logs-in to work. The different types of biometric data 95 can be stored in authentication data store 106 and used as a basis for performing authentication of the driver at a later time. Additionally, the different types of biometric data 95 can enable multiple subsequent use of different kinds of authentication datums 98 for when a driver receives a verification communication 141. Examples recognize that by increasing the number and kind of authentication datum 98 which can be required from the driver, it is more difficult for unscrupulous authorized drivers to allow for impersonators.

At various times, a training phase can be implemented to determine the driver profile store 125. The training phase can be implemented as a background process, for example, just after the driver is initially authenticated, or after the occurrence of a milestone (e.g., one month or year since authentication documents were obtained from the driver) or events (e.g., after a driver is an accident, etc.). In variations, the training phase may be implemented continuously or semi-continuously over an extended duration (e.g., during a time when the driver works for a transport service). In such variations, information about the driver can be continuously obtained to update the driver profile store 125.

In an example of FIG. 1B, the driver profiling subsystem 110 includes a driving profiler 112, a route/location profiler 114 and a MCD profiler 116 to determine and update the driver profile store 125. The driver profiling subsystem 110 can use MCD data 101 (which is communicated from the mobile computing device of the driver device) as a source for developing the driver profile store 125. For example, the mobile computing device can execute a process or application to communicate with the transportation related service 100. For example, the mobile computing device of each driver can include an application or process which executes to (i) initiate when the driver session begins, (ii) communicate MCD data 101 with the driver identifier 99 during the driver's work session, (iii) determine when the driver session is complete (e.g., the driver goes off-duty), and/or (iv) periodically communicate MCD data 101 when the application or process is operating on the mobile computing device. In some implementations, the MCD data 101 can provide an exclusive or primary source of data for developing/updating the driver profile store 125 for individual drivers. In particular, MCD data 101 can include various types of data which are acquired from the mobile computing device of the driver, such as sensor data 103, GPS data 105, MCD device identifier 107 and application data 109.

As an addition or alternative to MCD data 101, alternative input data 101B can be generated from resources which are embedded or otherwise integrated with the vehicle. For example, the input data 101B can be generated from an on-board diagnostic ("OBD") interface residing with the vehicle, in which case the input data 101B can include various sensor information (e.g., velocity, RPM, brake sensor, etc.) which is maintained by the vehicle. As still another addition or alternative, the input data 101C can be received from an onboard sensor device, such as a device that includes accelerometers to obtain acceleration data (e.g., lateral and forward/backward) and/or geo-aware resources (e.g., GPS, magnetometer, etc.). For example, a signage or marker device can be affixed to the inside of the windshield. Examples of input data 101B, 101C can be communicated to components of transportation related service 100 using, for example, a mobile computing device of the driver. For example, the mobile computing device of the driver can communicate with the OBD interface or integrated marker device using Bluetooth or other wireless (or wired) communication medium in order to obtain the respective input data 101B, 101C.

In more detail, the driving profiler 112 can define parameters which characterize the driving style of the driver. The driver profiling subsystem 110 can obtain MCD data 101, which the driving profiler 112 converts to parametric values that quantitatively describe the driving style and/or behavior of the driver. The driving profiler 112 can be trained using a training model 75, which can, for example, provide and tune a model to select and/or weigh input data based on driver-specific tendencies. The driving profiler 112 can operate during a training phase in order to determine training data from the particular driver. By way of example, the driving profiler 112 can determine parametric values for individual drivers that are indicative of (i) a vehicle speed for the driver relative to, for example, a speed limit, (ii) a braking characteristic or tendency of the driver, including typical braking magnitude and/or duration, (iii) an acceleration characteristic or tendency of the driver, and/or (iv) a lateral acceleration or turning characteristic of the driver. As in addition or variation, the driving profiler 112 can detect distinguishing movements of the driver's mobile computing device during transport which are unique or particularly indicative of a specific driver. By way of example, the driving profiler 112 can record a propensity of the driver to change lanes quickly or brake suddenly using a combination of sensor data 103 (e.g., from an accelerometer of the driver device). The driving profiler 112 can use aspects of the MCD data 101 to determine parametric values corresponding to the driving profile information 113. In particular, sensor data 103 and GPS data 105 can provide information that relates to lateral and forward/backward acceleration (e.g., from the accelerometer) and velocity (e.g., from the GPS and corresponding timestamps of the GPS location points) of the vehicle in which the corresponding mobile computing device is carried. In determining the driving profile information 113, other resources can also be utilized, such as a map resource (e.g., a map database accessible by the driver profiling subsystem 110) to determine speed limit, road type or road conditions.

In some variations, the driving profile information 113 can correspond to aggregate characterizations, which can, for example, categorize the overall driving style of the driver (e.g., "aggressive", "calm", "defensive," etc.). Such characterizations can be based on, for example, thresholds or other logic which are established when analyzing the parametric values that comprise the driving profile information 113.

The route location profiler 114 can operate to obtain geometric or position-based parametric values from the MCD data 101, to enable the creation of route location profile information 115 ("RLPI 115") for the driver profile store 125. By way of example, the RLPI 115 for a particular driver can identify one or more of: (i) a home position or location of the driver, (ii) routes or road segments typically taken by the driver, (iii) a geographic region where the driver typically operates in, (iv) location(s) where the driver launches the service application the driver device, provides input to go on-duty, provides input to go off-duty, and/or closes or suspends the service application, and/or (v) a type of road (e.g., highway versus back-roads) that the driver favors. In some variations, the route location profiler 114 can also include a training model 85 which develops a model to select and weigh input data for subsequent analysis.

As an additional or alternative, the driver profiling subsystem 110 can include the MCD profiler 116 to determine MCD profile information 117 for the driver profile store 125. The MCD profiler 116 can operate to determine identifying characteristics in a manner which the driver operates his or her mobile computing device, in order to determine the MCD profile information 117. For example, the MCD profiler 116 can detect or determine background processes used on the mobile computing device of the device before or during when transport is offered or provided. As an addition or alternative, the MCD profiler 116 can identify a device identifier (e.g., phone number, mobile device identification number) which is used by the mobile computing device of the driver, so that certain uses of the device can be detected (e.g., the driver making a phone call to a customer when providing transport). When the mobile computing device is detected in such uses, the location of the mobile computing device can be compared with that of the vehicle of the driver in order to determine whether the approximate location of the mobile computing device and vehicle are the same. In this way, a phone number or other similar identifier of the mobile computing device can serve as the MCD profile information.

As still another variation, the MCD profiler 116 can process sensor or application information which indicates a level, type or quantity of use of the mobile computing device by the driver. For example, the MCD profiler 116 can process sensor or application data to indicate how often the driver handles his device while driving, or the type of mobile device use (e.g., texting, GPS) the driver engages just before, during or just after a trip. In this way, the resulting MCD profile information 117 can provide a signature or identifier for the driver with respect to the manner and use of the driver's device. For example, the MCD profile information 117 can associate the level and type of device use when the vehicle is on a trip as being characteristic of a particular driver, and if a different level and/or type of use is detected for a trip, the indication of fraud may weigh towards the driver being an imposter.

When the driver profile store 125 is established for a particular drive, the transportation related service 100 can operate in an active phase for that driver. In the active phase, the profile checker 120 can receive the driver identifier 99 and MCD data 101 via the driver device interface 102. The profile checker 120 can access the driver profile store 125 of the driver in order to perform a comparison of the MCD data 101 against relevant aspects (e.g., DPI 113, RLPI 115, MCD profile information 117) of the driver profile store 125. The comparison can result in a determination that the MCD data 101, as collected over a given duration of time, is predicted or within a threshold of values predicted by the respective model(s) of the driver profile store 125. For example, the measured data can be compared to model data to determine a distance measure, which in turn can be compared to threshold values. As an addition or alternative, the determination made by the profile checker 120 is a score 121 which can provide a range of values that indicate a level of predictability of the MCD data 101 as compared against relevant aspects of the driver profile store 125. The score 121 can be stored in a verification status store 135, in association with the driver identifier 99, so that the value can be updated or otherwise weighted over the course of a duration in which the driver completes additional days of work. By way of example, the profile checker 120 can determine the score 121 to be within a range of values that are deemed "good", "fair" or "bad." The "good" or "fair" scores can be stored in the verification status store 135 along with a timestamp when the check was performed, while the "bad" score can result in the generation of alert 123, to trigger the verification manager 130 to initiate a process for verification of the driver. As an addition or an alternative, the "bad" score can also be stored in the verification status store 135 along with the timestamp. In some embodiments, the profile checker 120 can signal score 121 to update an aggregate score 127, which can be based on the score 121 of multiple sessions of the driver.

The verification manager 130 can determine when a verification action should be requested from the driver based on one or more criteria. In one implementation, the verification manager 130 makes the determination to request the verification action when the aggregate score 127 reaches a threshold value. For example, the profile checker 120 can record relatively low confidence scores 121 for multiple days (or measured durations within days when the driver works), triggering the aggregate score 127 to reach a threshold that requires verification action. As in addition to variation, the verification manager 130 can make a determination to request verification action in response to criteria such as the passage of time (e.g., every month or year, a driver is requested to perform a verification action), the occurrence of an event (e.g., the driver is inactive for an extended duration or has a different vehicle), or random selection.

In some variations, the verification manager 130 includes logic for selecting one of multiple possible verification actions to request from the driver. In particular, the verification manager 130 can include a frequency logic 132 and a selection logic 134. The frequency logic 132 operates to determine the frequency for requesting verification actions from the driver, which can be based on factors such as the aggregate score 127, the history of the driver (e.g., length of time the driver has been using the transport arrangement system overall or the length of time the driver has been currently on-duty or has the service application running), or the duration from when the driver was last authenticated in person or through other mechanisms. The selection logic 134 operates to determine a verification action for the driver. In one implementation, a list of possible verification actions can be sorted by priority or level based on intrusiveness and/or effectiveness of the verification action authenticating the suspected driver. By way of example, the selection logic 134 can select the verification action from a list of possible verification actions, which can also be sorted by level: voice check (lightest), picture check (light), personal question and challenge (medium), call placement and GPS check (medium) (e.g., driver is asked to make a call using their phone when arriving at a particular location), video and GPS check (hard) (driver takes video clip with surrounding and GPS tag), and/or in-person authentication to a trusted authentication source. The selection logic 134 can select the verification action based on one or more of (i) the aggregate score 127, (ii) consideration of prior verification actions requested, such to avoid a repeat instances of the same verification action being asked, (iii) random selection, (iv) seniority or trust level of the driver, and/or (vi) random selection.

The verification manager 130 can communicate a verification trigger 137 to the verification workflow 140. The verification trigger 137 can specify the verification action that is requested of the driver, as well as other parameters or information which may be necessary to evaluate the driver's response to the verification action. For example, the verification trigger 137 can include elements of the MCD data 101, such as driver identification 99 and/or GPS data 105 (indicating current position) for use with authenticating the driver.

The verification workflow 140 can include rules or other logic for implementing one or more specified verification actions. In particular, the verification workflow 140 can generate (i) a verification communication 141 that specifies a verification action 143 that the driver needs to perform, and (ii) action specific processes or logic for making the verification determination once the user performs the action. Depending on implementation, the verification action that is requested from the driver can be simple or complex. The simple verification actions may only require the driver to perform one operation, such as take an image or generate a voice file. The more complex verification actions may require the driver to perform a series of operations, such as actions in which the driver makes a video clip by first panning to a landmark or street sign, and then showing himself in the assigned vehicle at the same location. In some variations, the verification work flow 140 can cause the generation of prompts, human instructions or other programmatically triggered guides to direct the driver to perform the stated verification action, and to submit a resulting sample datum 78 for subsequent verification. As an addition or variation, the verification work flow 140 can include additional programmatic resources for performing various kinds of analysis, including image or audio analysis. The programmatic resources of the verification work flow 140 can also access and use the additional programmatic resources in order to ensure completion of the tasks specified in the verification actions.

In an example of FIG. 1B, the verification communication 141 and the verification action 143 can be communicated to the driver via the authentication interface 104. The driver can respond by performing the requested action, which can result in the driver providing a sample datum 78 for use in subsequent verification operations. The authentication interface 104 can store the sample datum 78, and programmatic resources of the verification workflow can perform necessary analysis on the sample datum 78 to make the verification determination. The authentication interface 104 and/or the verification workflow 140 can implement the programmatic resources for determining whether the sample datum 78 is a match, or alternatively, a sufficient match for a corresponding authentication datum 98. In performing the comparison, the verification workflow 140 can perform a variety of different types of analysis, including image analysis to compare images of the sample datum 78 to those of the authentication datum 98. For example, the verification workflow 140 can perform face recognition on the sample datum 78 to compare with the authentication datum 98 (e.g., picture of the driver holding his government issued identifier (e.g., driver's license or passport). As an addition or variation, the verification workflow 140 can also perform audio or voice analysis to compare the two datums. The result of the comparisons can be binary (match/no match) or on a scale (e.g., probability of match score). In the latter case, if the probability of match score exceeds a threshold, the verification determination can be made. In variations, however, the match score may also be stored and utilized to (i) trigger another verification check, (ii) weight or adjust the aggregate score 127 of the driver (e.g., increase or decrease the aggregate score), (iii) trigger the use of a different verification determinations, and/or (iv) adjust the timing of the next verification determination. In specifying the verification action(s) and evaluating the response, the verification workflow 140 can also utilize programmatic resources which analyze various forms of contextual data, such as geographic data (e.g., to place location of the driver at a given instance) or image analysis. By way of example, the verification workflow 140 can perform or utilize image analysis to view text in images (e.g., read street sign), recognize landmark and/or process maps or geographic information. In the latter case, for example, the driver can be instructed to perform the verification action at a particular location, and the verification workflow can verify that this action was performed.

The verification workflow 140 can process the authentication result 119 as a verification determination 139. In an example of FIG. 1B, the verification determination 139 can be communicated to the verification manager 130, which can update the aggregate score 127 ("updated score updated score value 129"). In a variation, the verification manager 130 can store the underlying authentication result 119 for use as historical data. For example, if the driver has multiple instances when the verification determination 139 is borderline passing then one or more values that are based on the authentication result 119 can be stored and used in selecting a next verification action or a time when the another verification determination will be performed. For example, the authentication score 119 can be implemented as a score represents a confidence value in which verification can be "certain" (e.g., score is above a highest threshold), "borderline" (e.g., score is above acceptable-threshold and below highest threshold), "uncertain" (e.g., score is below acceptable threshold and above unacceptable threshold) or "not acceptable" (e.g., score is below unacceptable threshold). The verification manager 130 can weigh down or trigger performance of a verification action based on the presence of historical data, such as provided by storing the authentication result 119 for multiple driver sessions or authentication attempts of the driver.

The driver manager 160 can access the verification status store 135 for the particular driver in order to implement control or management function on the driver. For example, if verification determination 139 indicates that the driver may be an imposter, then the driver manager 160 can communicate a message or programmatic control to cause the driver to cease work until authentication can be shown. Likewise, if verification determination 139 indicates that the driver is the actual individual who should be providing the service, the driver manager 160 can remain inactive for the driver in that instance.

In variations, the driver profile subsystem 110 includes components for determining a characterization of the driver's driving style from one or more trips of the driver. In an example of FIG. 1B, a trip profile store 195 stores trip data 191, corresponding to select sensor information from the MCD data 101 (e.g., sensor 103, GPS 105, ID 107). The trip profile store 195 can store the trip data 191 for a current, recent or past set of trips. A trip analysis component 194, which can operate in a manner described with examples of FIG. 1A, can process the trip data 191 in order to determine one more characterizations 193 of driving style for the driver. The characterizations 193 of the driving style can be made specific for a trip (e.g., current trip, most recent trip), and/or ongoing or for multiple trips.

Additionally, the characterization of driving style can have a variety of uses. In an example of FIG. 1B, the driving style determination can be stored and updated in driver profile 125, and/or used to trigger processes based on the determination of the specific profile.

Figure 5:
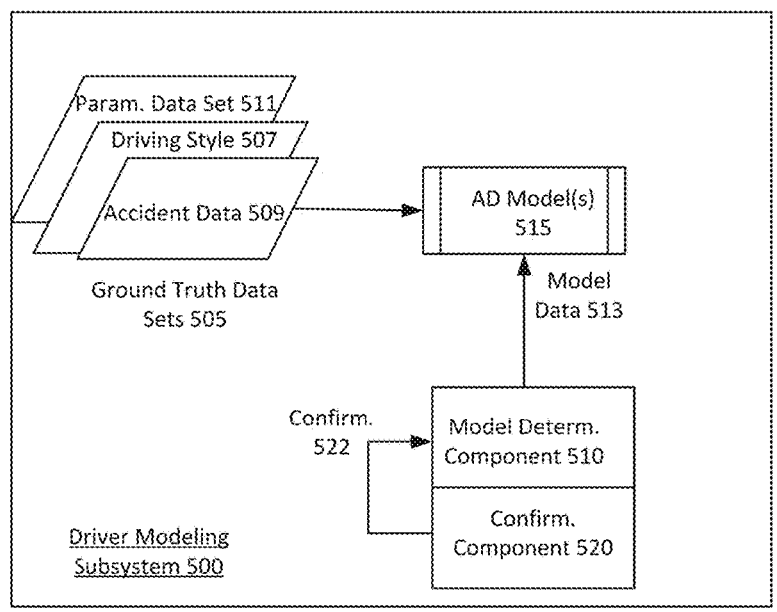
FIG. 5 illustrates an example of a driver modeling subsystem for profiling a driving style of a driver.

According to some examples, the trip analysis component 194 utilizes one or more models 185 in determining the characterizations 193 of the driver. The trip analysis component 194 can match a portion, parameterization or interpretation of trip data 191 to one or more models 185 for driving style of drivers in order to determine the characterizations 193 for the driver. In one implementation, the characterization 193 determined by the trip analysis component 194 is binary as to an undesirable characterization, such as whether the driver is "aggressive" or "dangerous" relative to the norm of other drivers. In variations, the characterizations 193 determined from the trip analysis component 194 can be made in degrees and across a spectrum which can also identify drivers who are "safe" or "cautious." Depending on implementation, other types of characterizations 193 of driving style can be determined from trip data 191, using alternative types of models 185. For example, FIG. 5 illustrates an implementation in which a model is developed to facilitate detection of drivers who drive aggressively or dangerously.

In an example of FIG. 1B, the trip analysis component 194 can signal a notification 199 which identifies a determination of an unwanted characterization to another component or entity of the transportation related service 100. For example, the trip analysis component 194 can signal the characterization of "aggressive driving", along with other parameters such as the specific trip or portion of trip, to the driver manager 160. The driver manager 160 can perform some remedial action such as suspending the driver (e.g., precluding requests for transport services to reach driver for a period of time), or directing the driver to take remedial actions to curb bad driving behavior.

Methodology

Figure 2:
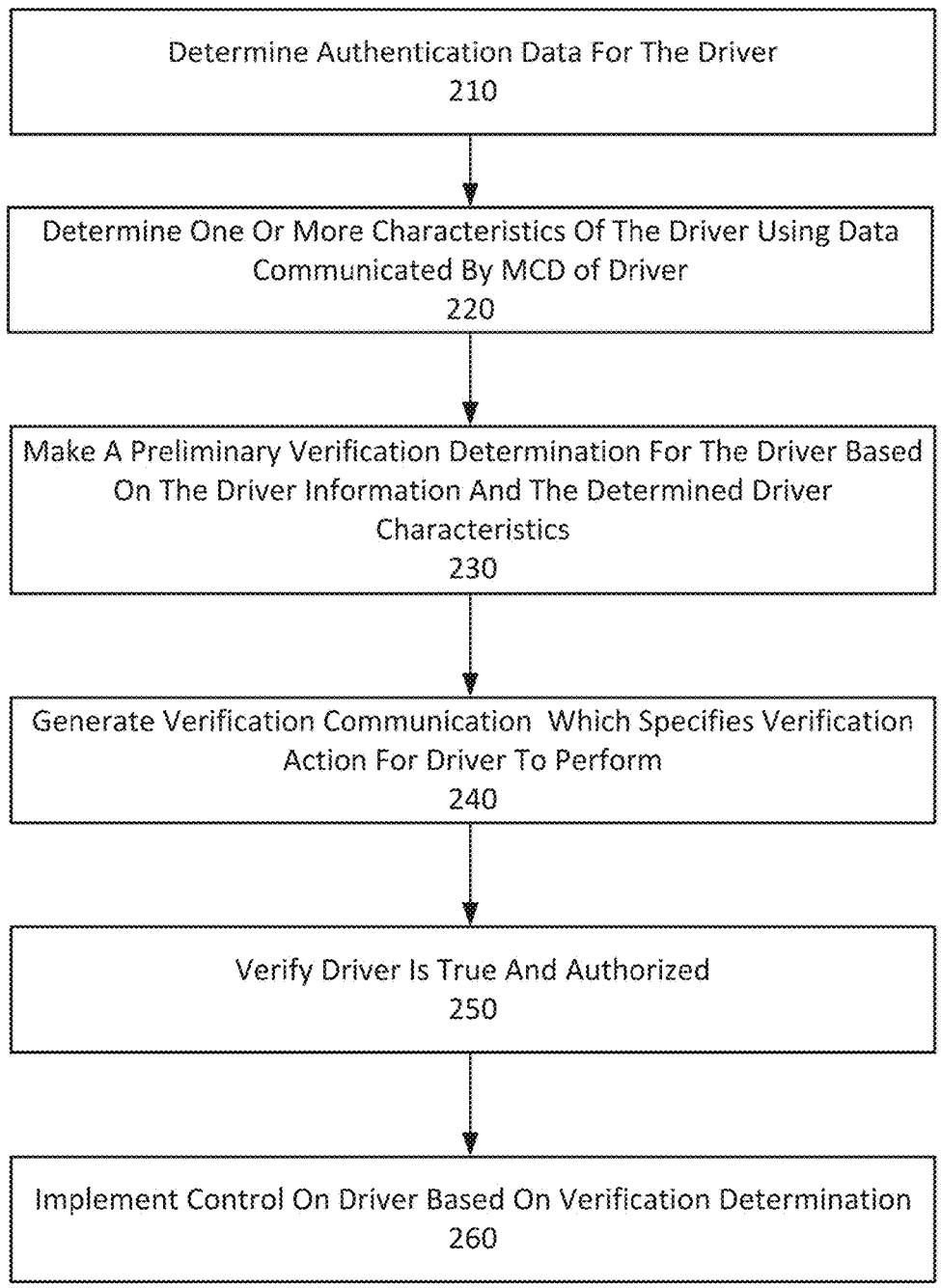
FIG. 2 illustrates a method for monitoring drivers of a transport service in order to prevent driver-substitution fraud.
Figure 3:
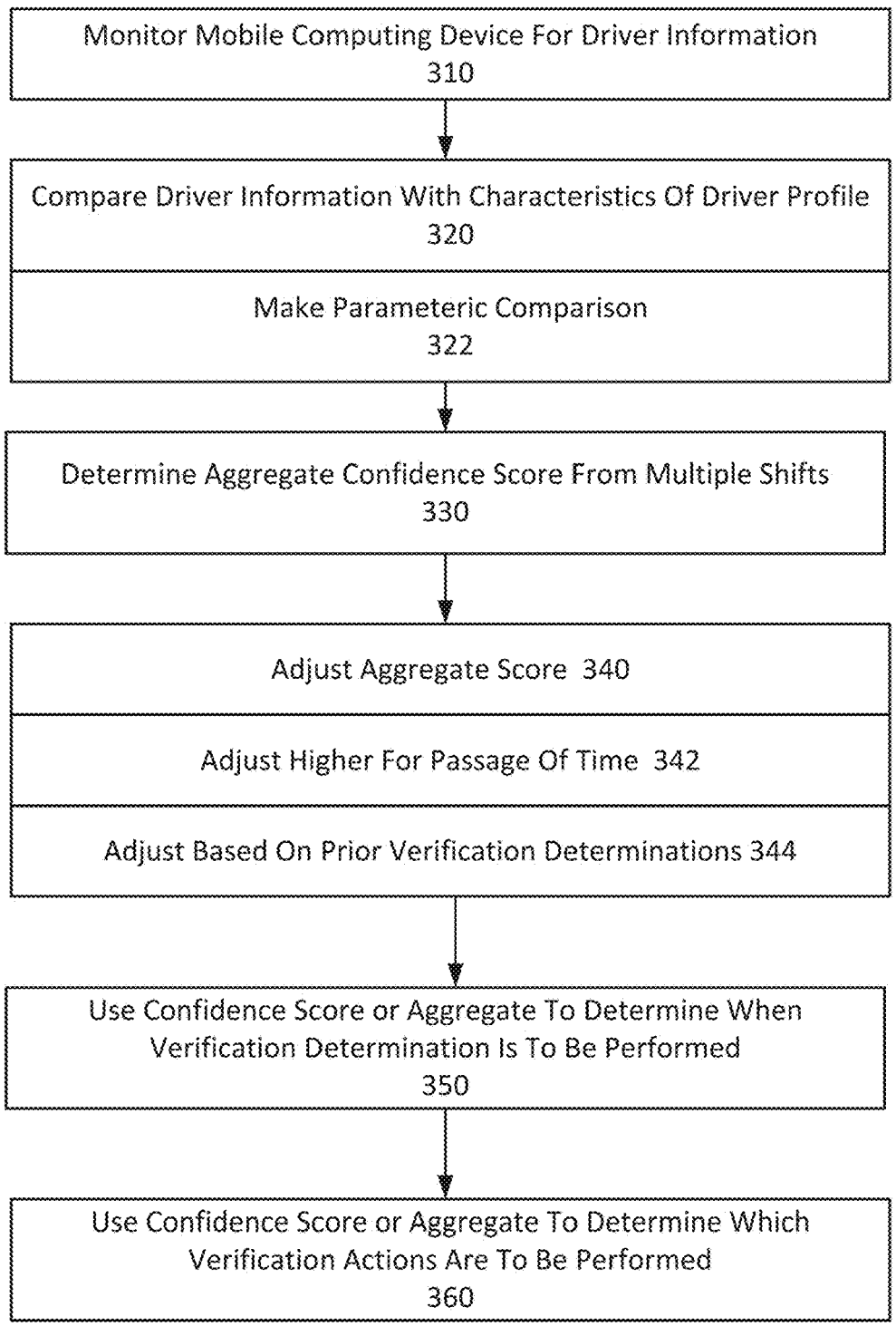
FIG. 3 illustrates an example method for requesting verification of drivers based on a cumulative authentication determination.

FIG. 2 illustrates a method for monitoring drivers of a transport service in order to prevent driver-substitution fraud. FIG. 3 illustrates an example method for requesting verification of drivers based on a cumulative authentication determination. In describing examples of FIG. 2 and FIG. 3, reference is made to examples of FIG. 1A and/or FIG. 1B for purpose of illustrating suitable components or elements for performing a step or sub-step being described.

With reference to FIG. 2, an authentication phase can be implemented at various times during a driver's relationship with a service (210). In one implementation, authentication can be performed at an initial time when the driver is first registered to operate and provide services for a transport service. As an additional or alternative, authentication may be required from an existing driver periodically (e.g., every year) or in response to events or conditions (e.g., driver an activity for extended duration, accident etc.). The transportation related service 100 can include logic of programming such as provided with the authentication interface 104, to guide the user actions in the authentication phase. For example, the user may be required to capture an image of his or her driver's license, and the authentication interface 104 may require the driver to capture a picture of his while holding the license. The submission of the authentication seed can accompany the use's submission of face image, voice sample and/or other biometric data. The transportation related service 100 can record the additional submissions as authentication datums 98, which provide additional sources of authentication when verification actions are requested from the driver. By way of example, the authentication interface can request a driver to provide a voice utterance, video clip, biometric information (e.g., finger or retina scan) or other information for storage and subsequent use as an authentication datum 98. Thus, the authentication seed can be used to determine and record additional authentication datums 98 for the driver.

In addition to authentication, one or more distinctive characteristics of the driver can be determined using the mobile computing device (and/or other device) carried by the driver during a trip or series of trips (220). According to some examples, a training phase can follow the authentication phase. The training phase can be implemented to determine distinctive characteristics of the driver's actions or behavior, using data communicated from the driver's mobile computing device, or other readily available network enabled communication interface (e.g., vehicle Internet connection). The driver profiling subsystem 110 can implement one or multiple processes to determine different types of characteristics from data communicated from a vehicle of the driver. In some variations, the transportation related service 100 can utilize data communicated from multiple devices within the driver vehicle, such as from an embedded network-enabled communication interface of the vehicle. The driver profiling subsystem 110 can use one or multiple training models in order to analyze and make meaningful use of the data communicated from the vehicles. For example, driver information that is collected over multiple days can be aggregated and used to model driver characteristics of driver behavior and driving style. The driver profile store 125 can use parametric values to model and quantify characterizations that are learned from (i) the driving style of the driver, (ii) the route taken or locations of the driver, and/or (iii) other mobile computing device activities performed by the driver during a day in which multiple trips are completed. Logic utilized by the driver profiling subsystem 110 (e.g., training models) can structure, weight and define quantitative parameters that characterize at least some aspects of the driver's driving style or behavior. The driver profile store 125 can include quantitative parameters or categorizations which are descriptive of the driver style and behavior over a duration of time which can include multiple trips (e.g., week, month or year). By way of examples, the parameters of 125 can classify the driving style of a driver, quantify an average or median number of miles the driver travels during a transport session, or define a general geographic location where the driver is normally located. As further examples, the parameters of 125 can include: average or median number of hours worked in a work session, average or median number of transports provided in a work session, average or median fare collected (or size of typical transport job). For profiles directed to route or location, statistical analysis can be utilized to measure, for example, likely routes or locations of the driver, as well as typical location/route of the driver over the course of a day. The training phase can be performed at an initial instance, such as following a set up phase which can occur when a new driver registers with the service. For example, the training phase can be established over the course of a driver's first few days in which service is provided, in order to determine parametric values that characterize driver behavior and driving style. In variations, the training phase can occur repeatedly, so as to fine-tune and/or develop dimensionality of driver behavior and driving style.

Once the profile of the driver is established, the transportation related service can initiate verification checks in which a preliminary verification determination is made about the driver during when the driver is providing transport services (230). The preliminary verification determination can be implemented using driver information obtained during the time when the driver operates the vehicle to provide services. In one implementation, the preliminary verification determination can be implemented using a confidence score 121 that is determined from comparing (i) driver information obtained from the mobile computing device (or other device) of the driver and carried into vehicle during a time period when the driver is providing transport services, and (ii) information in a corresponding driver profile. In one embodiment, the driver information can correspond to MCD data 101, obtained during a time when the driver provides transport services. Among other benefits, verification can be performed with relatively little cost or inconvenience to the driver, meaning verification can be performed repeatedly during a time period when a given drivers is providing a service. In some implementations, verification determinations can be made multiple times over the course of the drivers shift. In most cases, the verification determinations do not result in the driver having to perform an action, but in a small portion of cases, the drivers may need to take action.

Based on the preliminary verification determination, the transportation related service can specify one or more verification actions from the driver (240). With reference to an example of FIG. 1B, when the preliminary verification determination results in the confidence score 121 dropping below a threshold, or alternatively, the aggregate score 127 dropping below a threshold, then transportation related service triggers a requirement for further verification determinations from the driver. The components of the transportation related service may generate verification communications 141 for the driver, and require the driver to perform one or more verification actions.

By way of example, the verification actions that may be required of the user can include image based verification, such as provided by the driver taking a self-picture of video. In some variations, the requirement for image based verification can include requirements that the driver pose or take the picture in a manner that reduces the ability of an impersonator to take a picture of another picture of the true driver. In other variations, the image based verification can include additional requirements of corroboration, such as requirements of the image to include geo-tag or a backdrop of a landmark or street. Alternatively, the verification actions 143 can require the user to provide a voice or audio input, such as by way of the driver submitting a voice recording or speaking into the microphone of the mobile computing device. Still further, the verification requirement can require the user to check-in to a site to be verified by a human. As variations, the verification actions 143 can require other forms of biometric data verification, such as fingerprint scan or retina scan. Still further, the verification actions can include challenging the user with knowledge that is likely known only to the driver.

The verification actions that are performed by the driver can then be evaluated to determine if the driver is the true and authorized individual or a driver substitution (e.g., imposter) (250). In some variations, the determination is probabilistic, and the verification determination can include a probability or confidence value.

The transportation related service can implement one or more driver controls or follow-on actions based on the verification determination (260). For example, if the driver verification determination indicates the driver is an imposter, then the driver manager 160 can implement the control action of terminating or suspending the account of the driver. In variations, if the driver verification indicates a lack of confidence in the verification determination, then the driver manager 160 and/or verification manager 130 can perform a second verification determination (e.g., with higher safeguard), lower the aggregate score 127 and/or increase the frequency or occurrence of the next verification action.

With reference to FIG. 3, when the driver profile is established for a given driver, the mobile computing device of the driver can be monitored for one or more types of driver information (310). According to some embodiments, the driver information can include position data and sensor data. The position data can be determined from, for example, GPS resources of the driver's mobile computing device. The sensor data can include accelerometer data, such as acceleration data that is indicative of forward and backward acceleration, as well as lateral acceleration as measured by the driver's mobile computing device. The position and/or acceleration data can be cross-referenced to a map so that the acceleration data can be interpreted as braking data (e.g., when map indicates red light), velocity of the driver's vehicle, a geographic region of the driver's vehicle, turning data, routes taken by the vehicle, and/or other markers of the driver's style or behavior. The position and sensor data of the mobile computing device can be combined with other information, such as data which is descriptive of the manner in which a service application for the transport services is used.

The driver information can be compared to characteristics of the driver profile store for determining when or how often driver verification is to be determined (320). In some implementations, the driver characteristics can be parametric, so that the comparison of the driver information is quantitative and results in a confidence score for the driver (322). The confidence score 121 can reflect a comparison of driver information to driver parameters for a duration when the driver provides services. Additionally, the confidence score 121 can be obtained repeatedly for the driver in a given time period and/or over days when the driver provides services, and the confidence scores from multiple instances or days can be combined into the aggregate score 127 (330). In some implementations, the aggregate score 127 can reflect a trust level for the driver.

The aggregate confidence score can be cumulatively combined new confidence scores and further adjusted upward or downward for a variety of reasons (340). In one implementation, the aggregate score 127 can tend higher (or more confident) with passage of time (342), to reflect an assumption that most drivers will be bad actors. For example, once a preliminary trust level is reached, an assumption can more readily be made that the driver will not attempt to falsely switch with another driver. For example, with passage of time (e.g., several days or over months), a threshold for when driver verification is triggered can be raised to permit more deviation from the expected driver style and behavior. Additionally, when verification determinations are required from the driver and the driver passes, the result can be used to weight the aggregate score 127 (344). Likewise, if the verification determination reflects uncertainty about the driver, the aggregate score can be lowered or weighted down.

The determination of confidence score(s) can be utilized in selecting when verification actions are to be performed by the driver (350). In some embodiments, the aggregate score 127 is used as a basis for determining when the confidence score 121 of the driver requires a verification determination. Additionally, as the aggregate score 127 represents the accumulation of confidence scores 121, newly obtained confidence score 121 may require more significant divergence from prior scores in order to trigger verification. As an addition or alternative, the confidence score 121 for a given time period can be compared to a threshold in order to determine whether a verification determination is needed. Still further, one aspect of the driver information can be used as the basis for triggering the verification determination, regardless of aggregate confidence value 127 or threshold for confidence score 121. For example, the driver may start in a new city or suddenly drive at very unusual speeds, in which case the need for verification can be triggered regardless of the driver's confidence score.

Additionally, the determination of confidence score(s) can be utilized in selecting which verification actions are to be requested from a driver (360). In one example, the aggregate score 127 can be used as a metric for selecting the verification action, with relatively low scores (or those reflecting new drivers) requiring more austere verification actions (e.g., video capture) as compared to those requested from more trusted drivers (e.g., provide voice sample by answering personal challenge question). The verification actions can be assigned priority values or other logic in order to enable the selection of verification actions based on confidence scores 121.

EXAMPLES

Figure 4A:
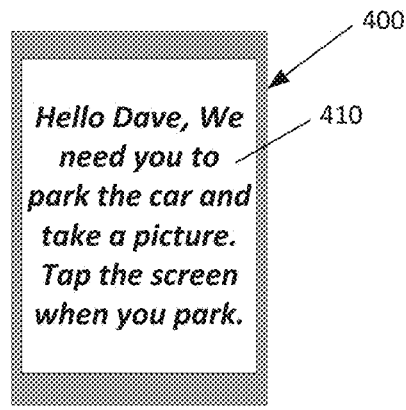
FIG. 4A through FIG. 4F illustrate examples of driver interfaces for displaying verification communications, according to one or more embodiments.
Figure 4B:
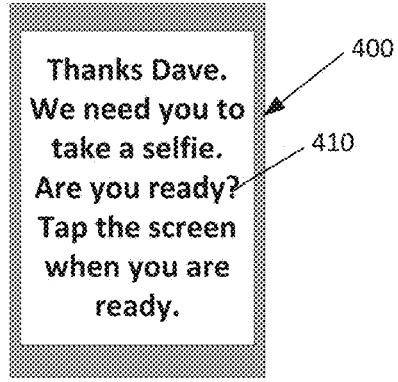

FIG. 4A through FIG. 4F illustrate examples of driver interfaces for displaying verification communications, according to one or more embodiments. For purpose of simplicity, selectable features and other graphics and content are omitted from the examples of FIGS. 4A through 4F. Examples of FIG. 4A through FIG. 4F are shown as being implemented on a mobile computing device 400 of a driver when the transportation related service determines that verification actions are needed from the drivers. In FIG. 4A and FIG. 4B, a display screen 410 of mobile computing device 400 displays a verification communication in which the verification action needed is for the driver to take an image of himself. For example, the driver may be instructed to park and take the picture. By forcing the driver to take the picture immediately and/or at a designated location, the time and GPS information associated with the picture can be used to further authenticate the picture.

Figure 4C:
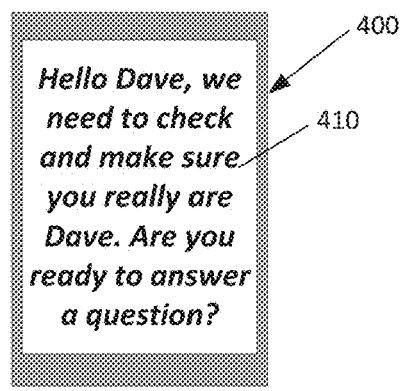
Figure 4D:
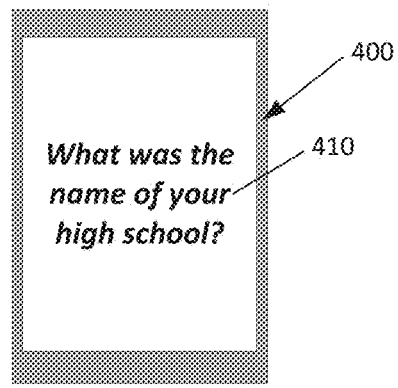

In FIG. 4C and FIG. 4D, a verification communication is shown which instructs the driver to provide a voice input. The voice input can be combined with a challenge question that asks the driver a challenge question (e.g., a question that is personal to the driver).

Figure 4E:
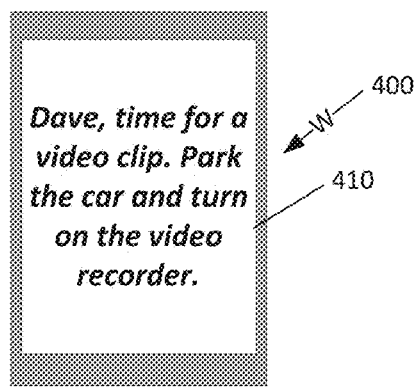
Figure 4F:
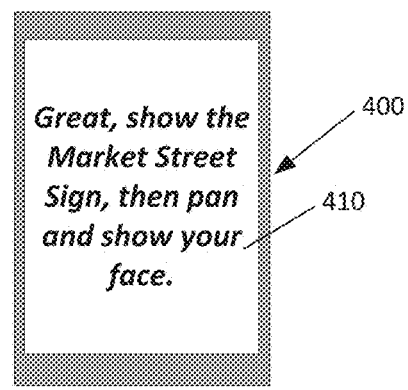

FIG. 4E and FIG. 4F illustrate a verification communication which prompts the user to provide a video input. The video clip can provide additional protection against fraudulent attempts, such as one in which a fake driver attempts to pass the verification determination by taking a picture of a picture of the real driver. In FIG. 4F, an alternative verification action required from the driver can require corroboration information, such as information indicating the driver is at a particular address or landmarks. As described with other examples, the verification actions may be prioritized or associated with other logic, so that more intrusive or difficult verification actions are generally required when confidence scores from driver monitoring are relatively low. In some examples, additional features, such as a timer (e.g., showing a count-down in seconds) can be included as part of the user interfaces, to provide the driver with an amount of time to complete the required action.

Aggressive Driver Modeling and Examples

FIG. 5 illustrates an example of a driver modeling subsystem for profiling a driving style of a driver. In an example of FIG. 5, a driver modeling subsystem 500 can be implemented with an objective of detecting or predicting undesirable driving behavior. In one implementation, the driver modeling subsystem 500 can be implemented to identify drivers who have an aggressive driving style, or tendency thereof. In transport services, such driving styles are undesirable, as they bring the potential for accidents, injury and liability to the transport provider. With reference to FIG. 5, the driver modeling subsystem 500 can be implemented as part of driver profiling system 10 to, for example, determine a model 25 for aggressive driving. Likewise, driver modeling subsystem 500 can be implemented as part of the driver profile subsystem 110 of the transportation related service 100.

As shown, the driver modeling subsystem 500 includes a model determination component 510, which can implement a learning algorithm (e.g., such as a supervised and iterative process) to develop one or more driving style models 515 using one or more sets of ground truth data 505. The driving style models 515 can be used to identify drivers who have driven aggressively, based on, for example, sensor information 21 (FIG. 1A) determined from driver vehicles when the respective drivers are on trips. As an alternative or addition, the driving style models 515 can be used to predict which drivers are likely to be aggressive in the future. In some implementations, the aggressive driving model(s) 515 can make a binary determination (or prediction) of a driver having an aggressive driving style or tendency. In variations, the aggressive driving model(s) 515 can have degrees of magnitude, to identify, for example, most aggressive drivers from borderline cases.

Multiple sources for ground truth data sets 505 can be utilized from which the driving model(s) 515 are subsequently developed for use with in determining driving styles (e.g., aggressive). In one implementation, the ground truth data set 505 includes driving style information 507 obtained from a population of drivers. The driving style information 507 can reflect sensor information for a population of drivers. The sensor information from the population of drivers can, for example, reflect information from transport providers in a given city of geographic region. Moreover, the sensor information collected for the driving style information 507 can be specific to roadways or types of roadways. In this way, the driving style information 507 can identify a normal deviation for sensor values, as determined from the sampled population, from which comparisons can be made for individual drivers or trips.

As an alternative or variation, the driving style information 507 can be selected for data from known aggressive driving styles or behavior. In one implementation, the driving style information 507 can provide either a positive or negative data set, representing aggressive and cautious driving respectively, for the model outcome determination. In some implementation, the driving style information 507 can be linked to information that indicates the driving style (aggressive/not aggressive). For example, the driving style information 507 can show sensor information 21 (see FIG. 1A), or trip data 191 (see FIG. 1B) for drivers of a given population whom are known, for example, to have good or bad driving records, or have cautious or aggressive driving styles. In some implementations, those drivers with good driving records provide negative examples in the model of aggressive style driving, while those drivers with bad driving records can provide bad examples. As an alternative, drivers in the population may be requested to provide a self-evaluation for their driving styles, and then sensor information 21 or trip data 193 can be obtained for these drivers.

In this way, the sensor information 21 and/or trip information 191 for the population of drivers can be aggregated to correlate, for example, ranges in values for lateral acceleration, forward/reverse acceleration, speed, propensity for accelerating (e.g., braking or turning hard) with a determination of aggressive driving style. The correlation can be binary, or made in degrees or by score, based on the information which can be supported from the ground truth data. The data sets for the individual drivers can be linked to the known characterization in order to provide model data for the model determination component 510. In some variations, the population of drivers which comprise the driving style information 507 can be segmented, for example, to a particular city or geographic region. Thus, the driving style information 507 which is used for model 515 can also be made specific for a city or geographic region.

In some implementations, the ground truth data 505 can also include accident data sets 509, which can include trip data 191 and sensor information 21 obtained from vehicles on trips in which accidents occurred. In variation, the accident data set 509 can weight down, or exclude accident data from drivers who were not at fault. Still further, the accident data sets 509 can include sensor information 21 and/or trip data 191 from multiple trips of a given driver which precede an accident.

Still further, as another example, the ground truth data 505 can include parametric data set 511 which is designated to be indicative of the aggressive driving style. For example, the parametric data set 511 can include values for speed that far exceed the speed limit, and braking or turning acceleration values which clearly are in the realm of "hard brakes" and "hard turns".

Various types of models can be implemented using an example of FIG. 5. For example, the model determination component 510 can implement, for example, Linear Regression process or K-nearest neighbor classification algorithm. The output of the model determination component 510 can include model data 513, which can be aggregated in the model 515.

The driver modeling subsystem 500 can be implemented in connection with the trip analysis component 194, which takes in uncategorized set of driver profile data and uses the model 515 to determine driver characterization (if possible). In some variations, the driver modeling subsystem 500 includes a confirmation component 520 which obtains confirmation data for at least some outcomes, in order to validate the model 515 by comparing the model outcome (e.g., characterization of the driver's driving style as aggressive) with the real world determination. The confirmation component 520 can be directly or indirectly related to the driver or trip for which a respective model was used to generate the outcome.

By way of example, in one implementation, the confirmation component 520 infers aggressive versus nonaggressive driving by the driver from behavior or actions of the passenger. For example, if the passenger gives the driver a relatively low rating, and the model 515 has an outcome that the driver was aggressive, the passenger rating for the driver confirms the model. The confirmation component 520 can thus be implemented as a rating interface which seeks a form of confirmation when the analysis component 26 generates an aggressive characterization 27. On occasions when the characterization 27 indicates an aggressive driving style and the feedback is low, the confirmation component 520 can generate a confirmation 522 which positively weights the model example or data used to determine aggressive driving. In some variations, if the opposite result is obtained, however, such as the passenger providing a relatively positive review while the driver outcome of the model 515 is "aggressive", then the confirmation component 520 can, depending on implementation, either ignore the rating so that there is no confirmation of the outcome, or signal a negative confirmation 522 for the outcome, reflecting that the outcome of the model was likely incorrect. In this way, the confirmation component 520 can signal inputs which tune the model 515, resulting in a more accurate determination when the model 515 is used to characterize the driving style of the driver.

In the event the driver is in a collision, near collision, receives a citation or incurs some other event which is reflective of dangerous driving, the confirmation component 520 detects the event and provides input for the model determination component 510. Depending on the training process, the training process can weight parameters or other model values which were characteristics of the driving style being confirmed.

Figure 6:
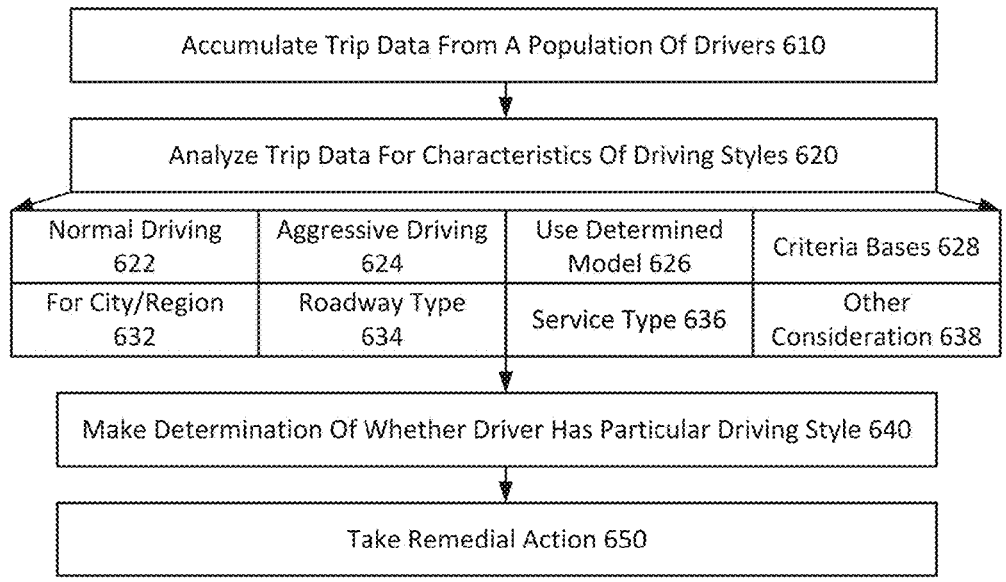
FIG. 6 illustrates a method for determining a driving style of a driver, according to one or more examples.

FIG. 6 illustrates a method for determining a driving style of a driver, according to one or more examples. A method such as described by an example of FIG. 6 be implemented using a driver profiling system 10 or subsystem 110, as well as a driver modeling subsystem 500, such as described with an example of FIG. 1A, FIG. 1B and FIG. 5. Accordingly, reference may be made to prior examples in order to illustrate a suitable component for performing a step or sub-step being described.

With reference to FIG. 6, the trip data is accumulated from a population of drivers, based on sensor data which is reported from, for example, mobile computing devices carried by the drivers (610). In some implementations, the population of drivers can be specific to a geographic region, such as a city, or a portion of the city. The population of drivers can also be classified by the type of vehicle the driver uses when providing the transport service and/or the type of transport service the driver providers.

The accumulated trip data can be analyzed to determine characteristics of different driving styles (620). According to some examples, the driving styles can include, for example, normal distribution or normal driving (622) and/or aggressive driving (624). In some implementations, the indicators of driving styles (e.g., aggressive driving) can be based on a determined model 515 (626). The indicators of driving style can alternatively correspond to perceived and quantified (e.g., measured by sensor values) criteria of a specific driving style (628), such as braking, turning, accelerating, etc. Furthermore, the indicators of aggressive driving can be specific to a city or geographic region (632), a roadway type and/or a specific roadway (634), a service type offered by the driver (636), and/or other consideration (638).

In some examples, a determination is made as to whether the driver of the transport service has a particular driving style, such as an aggressive driving style (640). The determination can be made from data obtained for the driver, as compared to the determined indicators of a specific driving style (e.g., aggressive driving). The determination can be in the form of, for example, a characterization 27 or score. In some implementations, once the determination is made that the driving style is, or was aggressive, some form of remedial action may optionally be taken (650). In one implementation, a communication can be provided to the driver which indicates undesirability of the driving style. As an addition or alternative, the tendency of the driving or driving style can be recorded and used for future monitoring. Still further, in some implementations, a driver can be suspended from providing transport, placed under probation, and/or provided training. Numerous variations to examples as described can alternatively be implemented.

Hardware Diagrams

Figure 7:
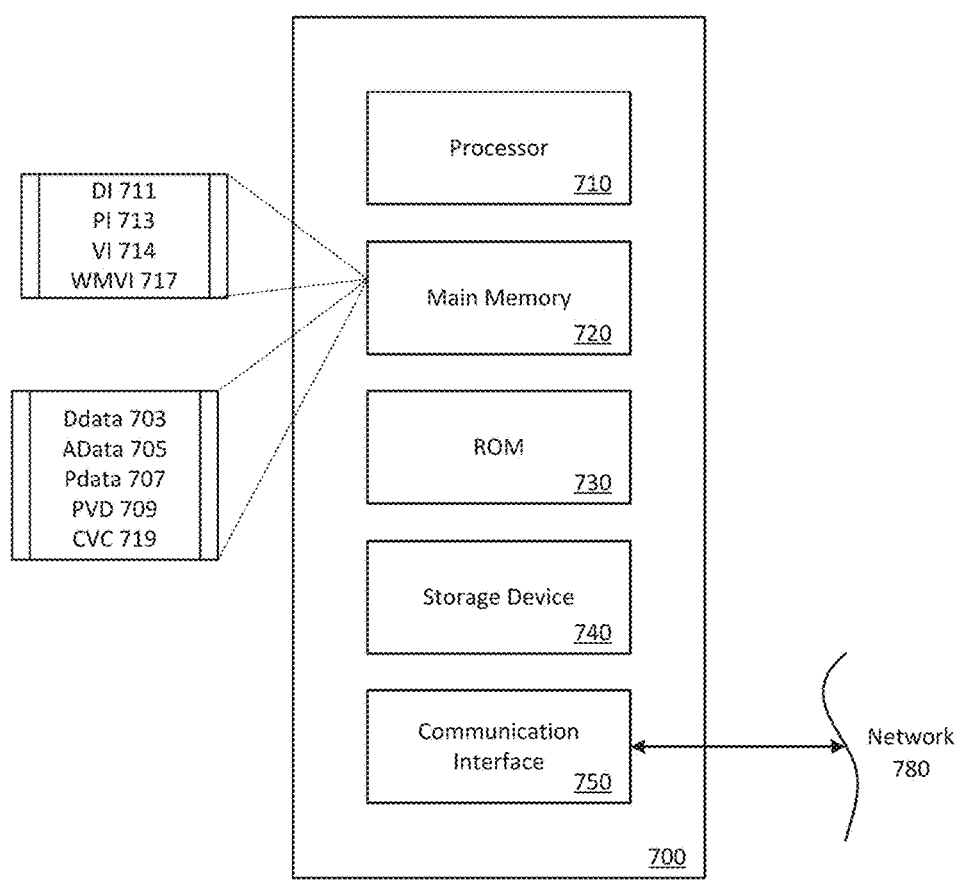
FIG. 7 is a block diagram that illustrates a computer system upon which embodiments described herein may be implemented.

FIG. 7 is a block diagram that illustrates a computer system upon which embodiments described herein may be implemented. A computer system 700 can be implemented on, for example, a server or combination of servers. For example, the computer system 500 may be implemented as part of a network service for providing transport services. In the context of FIG. 1A, driver profiling system 10 can be implemented using a system such as described with FIG. 5. Likewise, transportation related service 100 as shown with an example of FIG. 1B may be implemented using a computer system such as described by FIG. 5. Each of the driver profiling system 10 and the transport related service 100 can also be implemented using a combination of multiple computer systems as described by FIG. 7.

In one implementation, the computer system 700 includes processing resources 710, memory resources 720 (e.g., read-only memory (ROM) or random access memory (RAM)), a storage device 740, and a communication interface 750. The computer system 700 includes at least one processor 710 for processing information stored in the main memory 720, such as provided by a random access memory (RAM) or other dynamic storage device, for storing information and instructions which are executable by the processor 710. The main memory 720 also may be used for storing temporary variables or other intermediate information during execution of instructions to be executed by the processor 710. The computer system 700 may also include the memory resources 720 or other static storage device for storing static information and instructions for the processor 710. A storage device 740, such as a magnetic disk or optical disk, is provided for storing information and instructions.

The communication interface 750 enables the computer system 700 to communicate with one or more networks 780 (e.g., cellular network) through use of the network link (wireless or a wire). Using the network link, the computer system 700 can communicate with one or more computing devices, and one or more servers. In accordance with examples, the computer system 700 receives driver information 711 from the mobile computing device of individual drivers. The executable instructions stored in the memory 730 can include authentication instructions 719, which the processor executes to generate interfaces for collecting authentication data (e.g., authentication data 98 of FIG. 1). The executable instructions stored in the memory 730 can also include profiling instructions 713 which implement models for modeling or otherwise characterizing different aspects of driver behavior. The executable instructions stored in the memory 730 can also include verification instructions 714 to receive driver information from a given time period and to compare the driver information with the profiles that are associated with the same driver. The comparison can result in the processor making a preliminary verification determination. The memory can further store verification workflow and management instructions 717 to perform verification checks on drivers, depending on the preliminary verification determination from execution of the verification instructions 714. The memory 730 can include data that associates or links for each of multiple drivers (i) a driver identifier 703 (e.g., by mobile computing device), (ii) authentication data 705, (iii) profile data 707, (iv) preliminary verification determinations 709 and (iv) completed verification checks 719. By way of example, the instructions and data stored in the memory resources 720 can be executed by the processor 710 to implement the driver verification system 100 of an example of FIG. 1B. In performing the operations, the processor 710 can generate and send verification communications 737 via the communication interface 750 to the mobile computing device 600 of the driver.

The processor 710 is configured with software and/or other logic (shown with instructions 711-717 and data 703-719) to perform one or more processes, steps and other functions described with implementations, such as described by FIGS. 1A through 6, and elsewhere in the application.

Examples described herein are related to the use of the computer system 700 for implementing the techniques described herein. According to one embodiment, those techniques are performed by the computer system 700 in response to the processor 710 executing one or more sequences of one or more instructions contained in the main memory 720. Such instructions may be read into the main memory 720 from another machine-readable medium, such as the storage device 740. Execution of the sequences of instructions contained in the main memory 720 causes the processor 710 to perform the process steps described herein. In alternative implementations, hard-wired circuitry may be used in place of or in combination with software instructions to implement examples described herein. Thus, the examples described are not limited to any specific combination of hardware circuitry and software.

Figure 8:
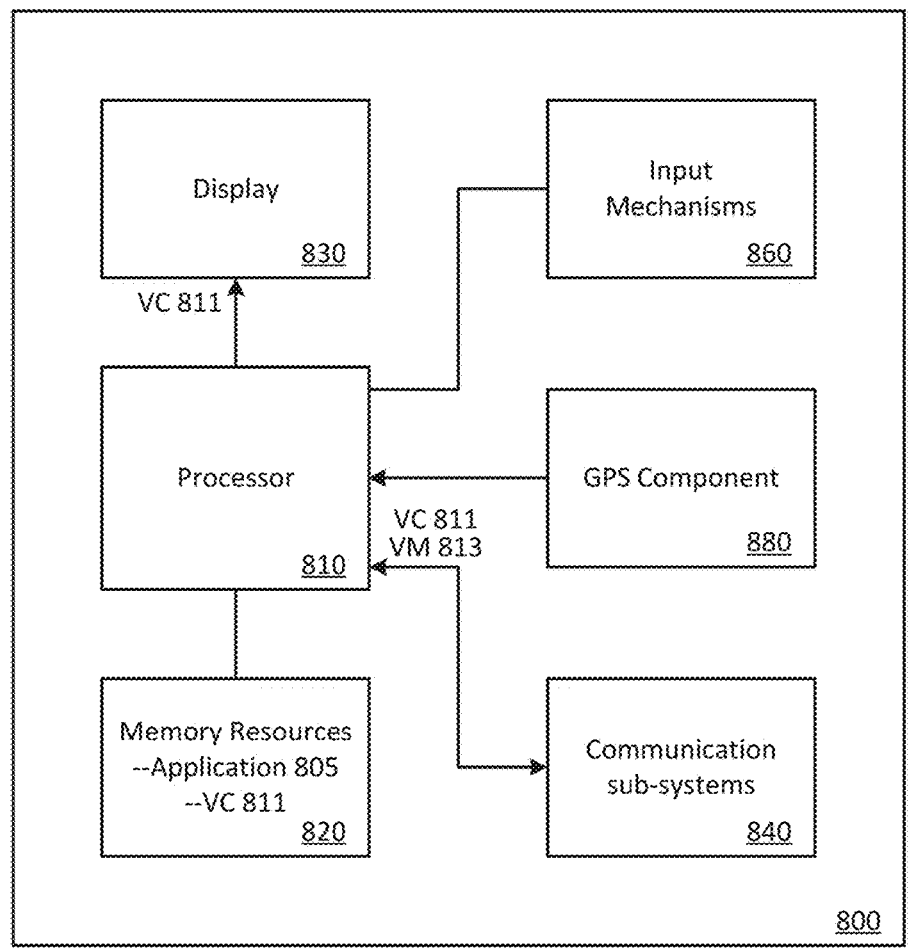
FIG. 8 is a block diagram that illustrates a mobile computing device upon which embodiments described herein may be implemented.

FIG. 8 is a block diagram that illustrates a mobile computing device upon which embodiments described herein may be implemented. In one embodiment, a mobile computing device 800 may correspond to, for example, a cellular communication device (e.g., feature phone, smartphone etc.) that is capable of telephony, messaging, and/or data services. In variations, the mobile computing device 800 can correspond to, for example, a tablet or wearable computing device. Still further, the mobile computing device 800 can be distributed amongst multiple portable devices of a driver.

In an example of FIG. 8, the computing device 800 includes a processor 810, memory resources 820, a display device 830 (e.g., such as a touch-sensitive display device), one or more communication sub-systems 840 (including wireless communication sub-systems), input mechanisms 860 (e.g., an input mechanism can include or be part of the touch-sensitive display device), and one or more location detection mechanisms (e.g., GPS component) 880. In one example, at least one of the communication sub-systems 840 sends and receives cellular data over data channels and voice channels.

A driver can operate the mobile computing device 800 when transport services are being provided or made available to provide, for example, transport services. The memory resources 820 can store one or more applications for linking the mobile computing device 800 with a network service that enables or otherwise facilitates transport services provided through the driver. The mobile computing device 800 can receive verification communication instructions 811 and messages 813 from a network service via one of the communication subsystems 840 (e.g., cellular interface). In response to receiving the verification communication instruction 811, instructions associated with the local application 805 can be executed in order to generate one or more communications that specify the verification action to users to perform. One or more parameters can also be specified with the verification action, such as parameters that (i) specify additional or augmented criteria for the action of the users to perform, (ii) specify a location of where the actions are to be formed, and/or (iii) timing parameters regarding when the action is to be performed. The processor 810 can display a verification communication interface 811 (such as described with examples of FIG. 4A through FIG. 4F) on the display device 830, or through other output interfaces (e.g., speaker).

While examples of FIG. 7 and FIG. 8 provide for a computer system 700 and mobile computing device 800 for implementing aspects described, in some variations, the mobile computing device 800 can operate to implement some or all of the functionality described with the driver profiling system 10 and/or transportation related service 100. For example, the application 805 can run various aspects of driver profile determination and require verification checks of the driver. The application 805 can include safeguards to enable verification and authentication to occur securely, with reduced or minimal use of external resources.

It is contemplated for embodiments described herein to extend to individual elements and concepts described herein, independently of other concepts, ideas or system, as well as for embodiments to include combinations of elements recited anywhere in this application. Although embodiments are described in detail herein with reference to the accompanying drawings, it is to be understood that the invention is not limited to those precise embodiments. As such, many modifications and variations will be apparent to practitioners skilled in this are. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. Thus, the absence of describing combinations should not preclude the inventor from claiming rights to such combinations.

What is claimed is:

1. A method for programmatically analyzing sensor data associated with a trip provided by a driver of a transport service to evaluate the driver, the method being implemented by one or more computer systems and comprising:

determining one or more indicators for each of one or more driving styles based on accumulated sensor data generated by and received from a plurality of driver computing devices for past trips of the transport service;

receiving, from a driver computing device of the driver, a set of on-trip sensor data generated by one or more sensors of the driver computing device during the trip provided by the driver for a passenger, wherein the set of on-trip sensor data includes data generated by one or more of an accelerometer, altimeter, global positioning system (GPS) resource, or gyroscope;

determining, for the driver, a driving style from the one or more driving styles based on the set of on-trip sensor data and the one or more indicators; and in response to the determined driving style for the driver being a particular one of the one or more driving styles, implementing one or more remedial actions including suspending the driver from providing additional trips for the transport service for at least a period of time.

2. The method of claim 1, wherein determining the one or more indicators includes determining one or more patterns of actions for an aggressive driving style, and wherein making the determination of the driving style for the driver during the trip includes analyzing the accumulated sensor data for a pattern of actions that correlate to the aggressive driving style.

3. The method of claim 2, further comprising developing a model of the aggressive driving style based on the one or more patterns, and wherein making the determination of the driving style for the driver during the trip is based on the model.

4. The method of claim 1, further comprising receiving a set of passenger data from a passenger computing device of the passenger to confirm the determination of the driving style for the driver during the trip.

5. The method of claim 3, wherein developing the model is specific to a subset of drivers who drive within a city or geographic region of the driver.

6. The method of claim 1, wherein determining the one or more indicators includes:

obtaining ground truth data by processing a subset of the accumulated sensor data that is generated by a subset of driver computing devices of the plurality of driver computing devices just before drivers associated with the subset of driver computing devices are involved in respective accidents; and analyzing the ground truth data to identify the one or more indicators.

7. The method of claim 1, wherein developing the one or more indicators includes identifying a subset of drivers each having one or more relevant driving incidents that are indicative of aggressive driving, and using a subset of the accumulated sensor data associated with the subset of drivers to determine the one or more indicators for an aggressive driving style.

8. The method of claim 1, wherein developing the one or more indicators includes analyzing the accumulated sensor data corresponding to one or more of an accelerometer, altimeter, global positioning system (GPS) resource, or gyroscope of one or more of the plurality of driver computing devices.

9. The method of claim 1, wherein determining, for the driver, a driving style from the one or more driving styles is based further on sensor data received from the passenger computing device.

10. The method of claim 1, wherein determining, for the driver, a driving style from the one or more driving styles is based further on data generated by an On Board Diagnostic ("OBD") device coupled to the driver's vehicle.

11. The method of claim 1, further comprising interpreting the set of on-trip sensor data based on a route of the driver to determine one or more of (i) a lane change, (ii) a braking event, (iii) a traffic light event, (iv) a speeding event, or (v) a near collision.

12. A computer system for programmatically analyzing sensor data associated with a trip provided by a driver of a transport service to evaluate the driver during the trip, the computer system comprising:
  a memory resource which store a set of instructions;
  one or more processors which execute the set of instructions to:
    determine, one or more indicators for each of one or more driving styles based on accumulated sensor data generated by and received from a plurality of driver computing devices for past trips of the transport service;
    receive, from a driver computing device of the driver, a set of on-trip sensor data generated by one or more sensors of the driver computing device during the trip provided by the driver for a passenger, wherein the set of on-trip sensor data includes data generated by one or more of an accelerometer, altimeter, global positioning system (GPS) resource, or gyroscope;
    determine, for the driver, a driving style from the one or more driving styles based on the set of on-trip sensor data and the one or more indicators; and
    in response to the determined driving style for the driver being a particular one of the one or more driving styles, implement one or more remedial actions including suspending the driver from providing additional trips for the transport service for at least a period of time.

13. The computer system of claim 12, wherein determining the one or more indicators includes determining one or more patterns of actions for an aggressive driving style, and wherein making the determination of the driving style for the driver during the trip includes analyzing the accumulated sensor data for a pattern of actions that correlate to the aggressive driving style.

14. The computer system of claim 12, wherein developing the one or more indicators includes analyzing the accumulated sensor data corresponding to one or more of an accelerometer, altimeter, global positioning system (GPS) resource, or gyroscope of one or more of the plurality of driver computing devices.

15. The computer system of claim 12, wherein determining, for the driver, a driving style from the one or more driving styles is based further on sensor data received from the passenger computing device.

16. A non-transitory computer-readable medium storing instructions that, when executed by one or more hardware processors of a computer system, cause the computer system to programmatically analyze sensor data associated with a trip provided by a driver of a transport service to evaluate the driver during the trip by:
  determining one or more indicators for each of one or more driving styles based on accumulated sensor data generated by and received from a plurality of driver computing devices for past trips of the transport service;
  receiving, from a driver computing device of the driver, a set of on-trip sensor data generated by one or more sensors of the driver computing device during the trip provided by the driver for a passenger, wherein the set of on-trip sensor data includes data generated by one or more of an accelerometer, altimeter, global positioning system (GPS) resource, or gyroscope;
  determining, for the driver, a driving style from the one or more driving styles based on the set of on-trip sensor data and the one or more indicators; and
  in response to the determined driving style for the driver being a particular one of the one or more driving styles, implementing one or more remedial actions including suspending the driver from providing additional trips for the transport service for at least a period of time.

* * * * *